United States Patent
Abate

(10) Patent No.: US 9,174,386 B2
(45) Date of Patent: Nov. 3, 2015

(54) BUTT-JOINING DEVICE COMPRISING ROLLING MEANS

(76) Inventor: Pietro Abate, Saint Etienne (FR)

( * ) Notice: Subject to any disclaimer, the term of this patent is extended or adjusted under 35 U.S.C. 154(b) by 315 days.

(21) Appl. No.: 14/002,840

(22) PCT Filed: Mar. 5, 2012

(86) PCT No.: PCT/IB2012/051022
§ 371 (c)(1),
(2), (4) Date: Sep. 3, 2013

(87) PCT Pub. No.: WO2012/120436
PCT Pub. Date: Sep. 13, 2012

(65) Prior Publication Data
US 2013/0340945 A1    Dec. 26, 2013

(30) Foreign Application Priority Data
Mar. 7, 2011  (FR) ...................... 11 51806

(51) Int. Cl.
*B29C 65/08*  (2006.01)
*B29C 65/74*  (2006.01)
*B29C 65/78*  (2006.01)
*B29C 65/00*  (2006.01)
*B65H 19/18*  (2006.01)

(52) U.S. Cl.
CPC ................. *B29C 65/74* (2013.01); *B29C 65/08* (2013.01); *B29C 65/7443* (2013.01); *B29C 65/7841* (2013.01); *B29C 65/7891* (2013.01); *B29C 66/03242* (2013.01); *B29C 66/1122* (2013.01); *B29C 66/43* (2013.01); *B29C 66/8163* (2013.01); *B29C 66/836* (2013.01); *B65H 19/1852* (2013.01); *B29C 66/8362* (2013.01); *B65H 2301/4615* (2013.01); *B65H 2301/46213* (2013.01); *B65H 2301/46327* (2013.01); *B65H 2301/5151* (2013.01); *B65H 2701/177* (2013.01); *B65H 2701/1752* (2013.01); *Y10T 156/1313* (2015.01)

(58) Field of Classification Search
CPC ............... B29C 65/74; B29C 65/7443; B65H 2301/4615; B65H 2301/46176; B65H 2301/46327
See application file for complete search history.

(56) References Cited

U.S. PATENT DOCUMENTS

| | | | |
|---|---|---|---|
| 3,384,527 A | 5/1968 | Fener | |
| 3,419,447 A * | 12/1968 | Hewitt | B29C 65/08 156/251 |
| 3,796,625 A | 3/1974 | Rutledge | |
| 4,490,199 A * | 12/1984 | Dunning | B29C 65/08 156/157 |
| 5,632,831 A * | 5/1997 | Stull | B29C 65/086 156/159 |
| 6,402,868 B1 | 6/2002 | Tagawa | |
| 6,554,931 B1 * | 4/2003 | Blanchard | B29C 65/08 156/251 |
| 7,563,336 B2 * | 7/2009 | Abate | B29C 65/086 156/251 |
| 8,142,585 B2 * | 3/2012 | Aoshima | B29C 55/08 156/157 |

FOREIGN PATENT DOCUMENTS

FR  1516183 A  1/1968

* cited by examiner

*Primary Examiner* — Mark A Osele
(74) *Attorney, Agent, or Firm* — William H. Eilberg

(57) ABSTRACT

A device for butt-joining a product made of strips or webs of material includes a soldering and cutting workstation and a rolling workstation. The butt-joining device includes apparatus for adjusting the relative position of a rolling component and the soldering and cutting zone to be rolled.

20 Claims, 18 Drawing Sheets

US 9,174,386 B2

BUTT-JOINING DEVICE COMPRISING ROLLING MEANS

TECHNICAL FIELD OF THE INVENTION

The present invention relates to a device for butt-joining a product in a strip or web of material. Such a device is used to join end-to-end two successive strips or webs of product: the initial end of a second strip or web of product is secured to the final end of a first strip or web of product that has been used in its virtual totality. Said first and second strips or webs of product are usually wound on unwinding reels.

As known in document U.S. Pat. No. 3,384,527 A, a device for butt-joining a product in form of a web or strip of material comprises:
- a heat-welding and cutting workstation capable of welding and cutting by heating by means of electrical resistances two thicknesses of product in a heat-welding and cutting zone,
- a laminating workstation with laminating means by heating by means of electrical resistances of the heat-welding and cutting zone, between which said product in a strip or web of material is designed to be moved in a movement defined by means for retaining the product upstream of the laminating workstation and by means for pulling the product downstream of the laminating workstation.

Such a device is usually used for the butt-joining of products that can be heat welded by ultrasound, such as nonwovens, plastic films or else fabrics comprising hot-melt material.

In this known butt-joining device, after execution of the heat-welding and cutting operations, the product is moved manually by an operator to the laminating workstation in order to place the heat-welding and cutting zone to be laminated in correspondence with the laminating means.

The manual positional adjustment operations necessary that are carried out by an operator involve relatively long stopping times of the machine processing the product in a strip or web of material, inducing a considerable loss of productivity. Specifically, it is sometimes possible that the butt-joining operation takes more time than the unwinding and complete treatment of a reel of product.

The manual intervention of the operator must also be carried out by inserting his hands and arms into the butt-joining device and into the machine that treats the product comprising said butt-joining device, which involves risks for the safety of the operator.

Although the manual intervention of a skilled operator makes it possible to ascertain certain parameters such as the stretching of the product by elastic deformation when it is unwound, the manual operation of positioning the heat-welding and cutting zone in correspondence with the laminating means nevertheless remains approximate, notably for products in a strip or web of material of very great width for which an operator has difficulty in placing the rectilinear heat-welding and cutting zone with an appropriate parallelism with respect to the equally rectilinear path of the laminating means.

If it is sought to move the product in a strip by mechanical retention and pulling means, the position of the heat-welding and cutting zone then depends on the stretching of the product under the effect of it being pulled, and an offset may therefore occur relative to the laminating workstation if the mechanical characteristics of the product vary.

The result of this is that the heat-welding and cutting zone to be laminated is often placed in an unsatisfactory manner with respect to the laminating means, which may cause the inappropriate laminating of portions of the product with a single thickness which will thus be weakened, and which may, on the other hand, cause the absence of laminating of portions of the heat-welding and cutting zone to be laminated which then, following the heat-welding and cutting operations, has a fragile and precarious cohesion. These imperfections may induce a partial or complete tearing of the product when the latter is moved in tension to a subsequent workstation.

SUMMARY OF THE INVENTION

The problem proposed by the invention is to make possible and effective a mechanization of the operations for butt-joining a product in a strip or a web of material, by reducing the influence of the variations of the mechanical characteristics of the product such as its elasticity, so as to limit the manual interventions of an operator and the dexterity required of the latter, and so far as to improve productivity and the safety of the operators.

In order to achieve these and other objectives, the invention proposes a device for butt-joining a product in a strip or in a web of material, comprising:
- a heat-welding and cutting workstation capable of heat-welding and cutting two thicknesses of product along a heat-welding and cutting zone,
- a laminating workstation with means for laminating by heating the heat-welding and cutting zone, between which said product in a strip or in a web of material is designed to be moved according to a movement defined by means for retaining the product upstream of the laminating workstation and by a means for pulling the product downstream of the laminating workstation;

according to the invention, in the heat-welding and cutting workstation and in the laminating workstation, the heating is carried out by ultrasound, and the butt-joining device comprises means for adjusting the relative position of the laminating means and of the heat-welding and cutting zone to be laminated, so that, after heat-welding and cutting and after movement of the heat-welding and cutting zone to the laminating workstation, the heat-welding and cutting zone to be laminated is placed in correspondence with the laminating means.

The adjustment means allow an effective adjustment of the relative position of the laminating means and of the heat-welding and cutting zone to be laminated during the laminating operation when the movement of the product is ensured by mechanical retention and pulling means, such that said relative position is independent of the mechanical characteristics of the product such as its elasticity which vary from one product to another depending on, for example, the thickness and the nature of the materials of which it is made.

Ultrasound heating concentrates the heating only in the material of the product in a strip or web, and only in the zone to be heat-welded, to be cut or to be laminated. The result of this is a greater accuracy of the work and better reproducibility.

Moreover, in the case of mechanical means for retaining and pulling the product, the conditions of moving the product are usually constant for a series of successive reels of one and the same product.

It is then possible to carry out a first adjustment of the relative position of the laminating means relative to the heat-welding and cutting zone to be laminated during the butt-joining between the first two reels. The adjustment, after having been carried out, can be retained for all the subsequent butt-joining operations intended to be carried out on the same product in a strip or web of material, with an appropriate and reproducible quality.

The manual intervention of an operator is therefore necessary only for a first adjustment, no manual operation for adjusting the relative position of the laminating means and of the heat-welding and cutting zone to be laminated thereafter being necessary.

According to a first embodiment of the invention, it can be provided that:
- the adjustment means comprise means for the relative movement of the laminating workstation and heat-welding and cutting workstation,
- the adjustment means comprise locking means suitable for fixing the laminating workstation and the heat-welding and cutting workstation at different distances of relative separation.

Adjusting the relative spacing distance between the heat-welding and cutting workstation and the laminating workstation makes it possible to make the following lengths equal: on the one hand the length of the path traveled by the product between the retention means and the heat-welding and cutting workstation before the advance by pulling, and on the other hand the length of the path traveled by the product between the retention means and the laminating workstation after the advance by pulling.

According to a second embodiment of the invention, it can be provided, as an alternative or in addition to the first embodiment of the invention, that:
- the adjustment means comprise a first product deflection bar, situated between the retention means and the heat-welding and cutting workstation and extending in a first direction of extension perpendicular to the direction of travel of the product,
- the adjustment means comprise first means for transverse movement of the first deflection bar, capable of moving the first deflection bar so as to adjust the length of the upstream section of product extending from the retention means to the heat-welding and cutting workstation.

By moving the first product deflection bar, the length of the upstream section of product extending from the retention means to the heat-welding and cutting workstation is lengthened or shortened so that this length exactly matches the length of product that will extend from the retention means to the laminating workstation once the heat-welding and cutting zone has been moved to said laminating workstation.

Advantageously, the device may comprise means for retaining the product upstream of the heat-welding and cutting workstation, which means are capable of immobilizing an upstream section of product extending from the retention means to the heat-welding and cutting workstation.

The retention means may preferably comprise:
- a third product deflection bar,
- pinching means that can be moved selectively between a retention position in which the pinching means press on the third product deflection bar by means of the product, and a position of release in which the pinching means are separated from the third deflection bar.

Such pinching means are simple to produce and easy to automate for a reliable and effective immobilization of the product. Preferably, the pinching means are placed as close as possible to the heat-welding and cutting workstation, which means that the third product deflection bar is preferably the deflection bar placed immediately in front of the heat-welding and cutting station on the path of the product. Such an arrangement makes it possible to limit the length of the upstream section of product extending from the retention means to the heat-welding and cutting workstation, which reduces the risks of drift by elastic lengthening of this upstream section.

As an alternative to the use of pinching means, it is conceivable to use any appropriate means for immobilizing the unwinding of the product in a strip or web of material, by immobilizing for example the unwinding reel on which the said product in a strip or web of material is usually wound.

Advantageously, it can be provided that:
- the laminating workstation comprises a laminating counterpart extending in a third direction of extension, with a work face that is substantially flat,
- the laminating means are secured to a support that can be moved in the third direction of extension opposite the laminating counterpart,
- the laminating means are secured to bearing means formed to press against the work face of the laminating counterpart,
- the laminating means are secured to the support by means of connecting means formed to allow:
  - a movement of translation in a direction substantially perpendicular to the plane of the work face,
  - a rotary movement about a direction substantially parallel to the third direction of extension.

Such connecting and bearing means make it possible to flatten the product against the whole surface area of the work face of the laminating counterpart, which allows the laminating means to follow the possible deformations (twists, bends, etc.) of the laminating counterpart so that an even and smooth laminating is carried out over the whole width of the product in a strip and over the whole length of the heat-welding and cutting zone to be laminated.

Preferably, the bearing means may, by means of the product, press against the work face of the laminating counterpart on either side of the heat-welding and cutting zone to be laminated.

The bearing means therefore press on the product on either side of the heat-welding and cutting zone to be laminated and do not touch the heat-welding and cutting zone to be laminated which has, before laminating, an ungainly geometry and a precarious fragile cohesion. Coming into direct contact on the heat-welding and cutting zone to be laminated which has been geometrically deformed by being flattened could cause an at least partially breakage of the heat-welding and cutting zone to be laminated.

Advantageously, the bearing means may comprise rolling means with two wheels situated on either side of the laminating means. The rolling means make it possible to flatten the product onto the laminating counterpart while limiting the risks of jamming the product under the bearing means.

According to a first variant, the heat-welding and cutting zone of the product may be moved by pulling from the heat-welding and cutting workstation to the laminating workstation by means for advancing the product of a subsequent workstation situated downstream of the laminating workstation.

In this way advancement means are used that are already present in the machine containing the butt-joining device or in the next machine with a subsequent workstation. This variant is economical because it uses existing actuators. The subsequent workstation may, for example, be a station for cutting the product along its width into a plurality of strips of reduced width with winding means for producing reels of reduced width.

According to a second variant, it can be provided that:
the device comprises accumulation means that the product downstream of the laminating workstation traverses,
the accumulation means are suitable for moving by pulling the heat-welding and cutting zone to be laminated of the product from the heat-welding and cutting workstation to the laminating workstation.

Using accumulation means makes it easier to automate the advance of the product because one then dispenses with the usually high inertia of the existing actuators used for a subsequent workstation situated downstream of the laminating workstation.

Moreover, one avoids making said subsequent workstation work at a usually low movement speed which does not correspond to the nominal working speed of this subsequent workstation and which would induce zones of defect on the treated product.

According to a first possibility, the product may traverse the accumulation means on a zigzag path of which the length is adjustable.

According to another possibility, the accumulation means may comprise:
at least one second product deflection bar situated downstream of the laminating workstation and extending in a second direction of extension perpendicular to the direction of travel of the product,
second transverse movement means of the second deflection bar so as to adjust the length of the product section situated downstream of the laminating workstation.

Advantageously, the movement means can move the first deflection bar or the second deflection bar in a movement of translation.

As an alternative, the movement means can move the first deflection bar or the second deflection bar in a rotary movement about an offset axis parallel to the direction of extension of said first deflection bar or second deflection bar.

A rotary movement by pivoting of the first or the second deflection bar about an offset axis parallel to its direction of extension is easier to achieve than a movement by translation in the case of treating a product of great width requiring a machine of great width. Specifically, moving a bar of great length (occupying the whole width of the product) sideways in translation may present risks of immobilization and of losses of parallelism by bending or twisting.

Advantageously, the heat-welding and cutting workstation may comprise heat-welding-cutting means. This improves the compactness of the butt-joining device and further improves the accuracy in the positioning of the zone to be laminated relative to the laminating means, the position of the heat-welding zone exactly matching the position of the cutting zone.

Preferably, it can be provided that:
the heat-welding and cutting workstation comprises a heat-welding and cutting counterpart extending in a fourth direction of extension, with a substantially flat work face,
the heat-welding-cutting means comprise a sonotrode with a sharpened face.

Advantageously, it can be provided that:
the laminating workstation comprises a laminating counterpart extending in a third direction of extension, with a substantially flat work face,
the laminating means comprise a sonotrode with a substantially flat face.

Advantageously, the butt-joining device may comprise means for deforming the work face of the heat-welding and cutting counterpart and/or of the laminating counterpart.

It is therefore possible to rectify the geometry of the work surface in cases in which it might have deformations by bending or twisting of the counterpart due to its great length.

In practice, it can advantageously be provided that:
the heat-welding and cutting counterpart and/or the laminating counterpart comprises a T-shaped cross section, the work face being supported by the external face of the upper bar of the T,
the deformation means comprise at least one screw designed to press against the vertical bar of the T, preferably two screws each situated in the vicinity of one end of said counterpart.

Preferably, the heat-welding and cutting workstation and/or the laminating workstation may comprise pressing means designed to press against the corresponding counterpart by means of the product. The pressing means allow a reliable positional retention of the product with respect to the heat-welding and cutting means and/or the laminating means during the heat-welding, cutting and/or laminating operations.

Advantageously, it can be provided that the counterpart(s) can be moved toward the corresponding pressing means in order to cause said pressure.

BRIEF DESCRIPTION OF THE DRAWINGS

Other objects, features and advantages of the present invention will emerge from the following description of particular embodiments, made with respect to the appended drawings, amongst which.

DESCRIPTION OF THE PREFERRED EMBODIMENTS

Figure 1:
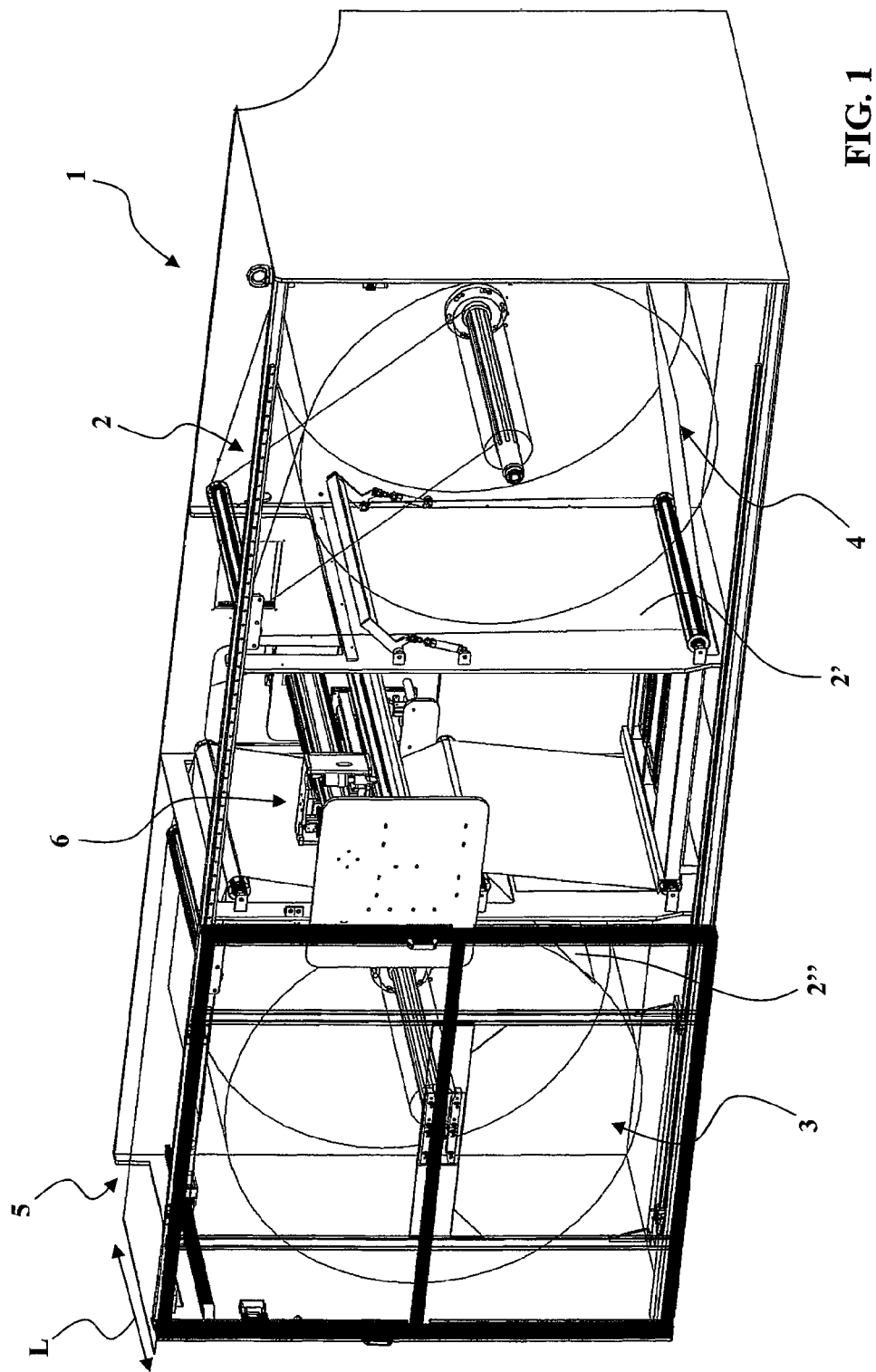
FIG. 1 is a view in perspective of a machine for treating a product in a strip or web of material, comprising a butt-joining device according to the invention.

FIG. 1 illustrates a machine 1 for treating a product 2 in a strip or web of material, which product 2 wound onto two unwinding reels 3 and 4. The unwinding reels 3 and 4 are successively unwound gradually as the product 2 exits at the exit zone 5 where a subsequent workstation is usually provided, such as a station for cutting the product 2 to its width L in a plurality of strips of narrower width.

In order to prevent overcomplicating the description of the invention and to make it easier for the reader to understand, the subsequent workstation is not shown.

Once the product 2 stored on the unwinding reel 3 has been fully used, the initial end of the product 2 stored on the unwinding reel 4 is butt-joined with the final end of the product 2 of the unwinding reel 3. This butt-joining operation is carried out by the butt-joining device 6 provided in the machine 1.

Once the butt-joining operation has been carried out, the unwinding reel 4 is unwound for the work of the subsequent workstation, which makes it possible, in concurrent operation time, to replace the used up unwinding reel 3 with a new unwinding reel.

Figure 2:
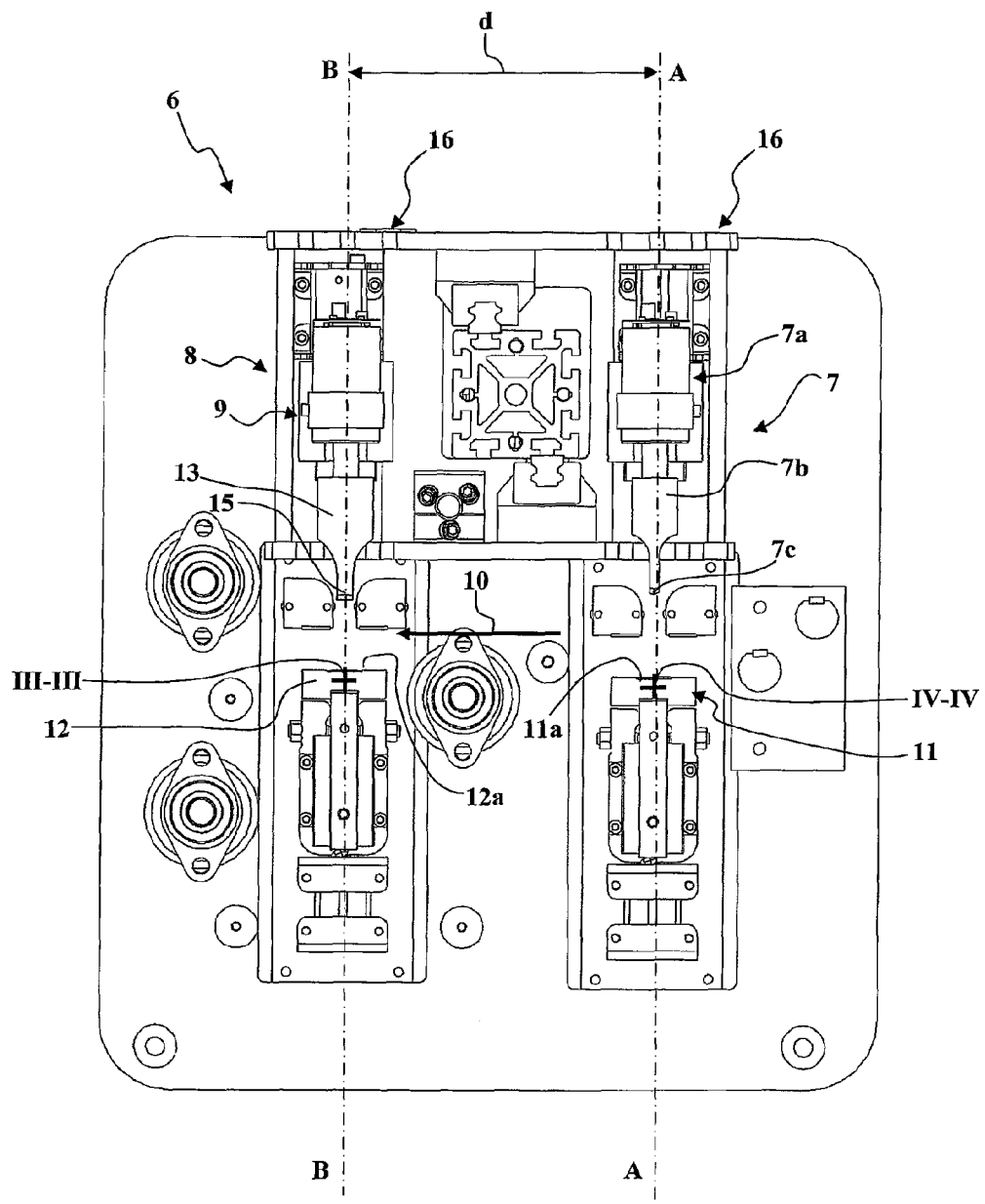
FIG. 2 is a partial side view of the butt-joining device of the machine of FIG. 1.
Figure 3:
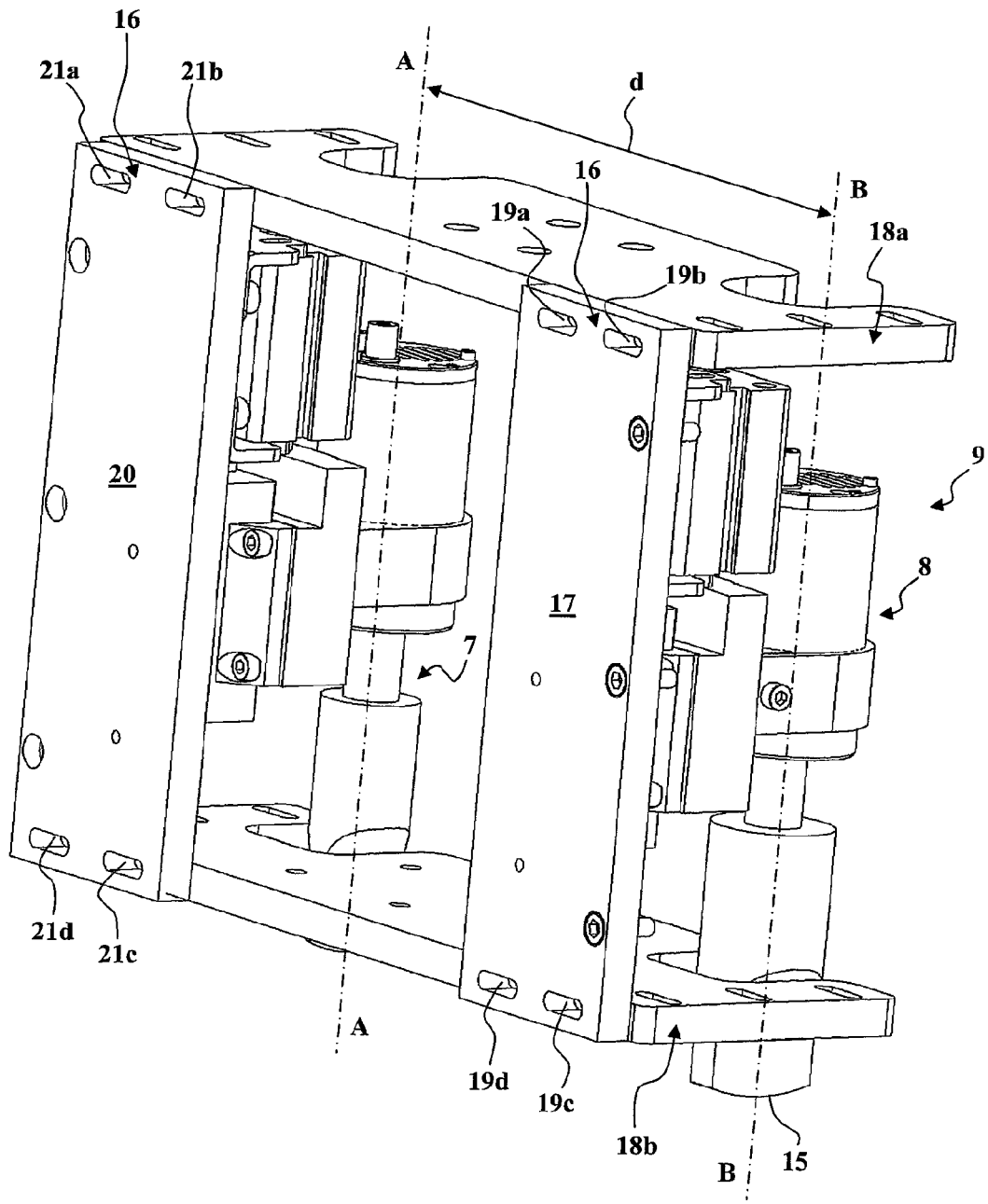
FIG. 3 is a view in perspective of the heat-welding and cutting workstation and of the laminating workstation of the device of FIG. 2, comprising adjustment means according to a first embodiment.
Figure 4:
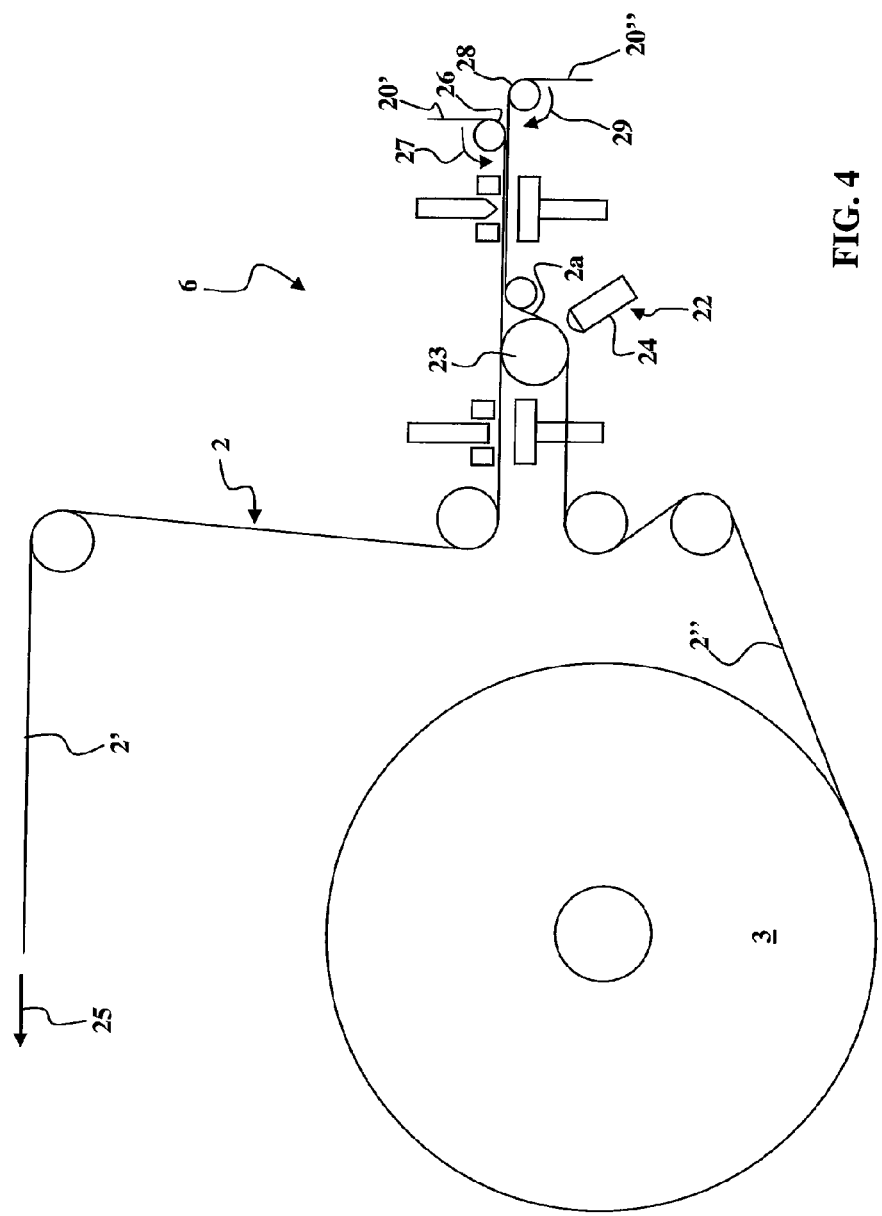
FIGS. 4 to 9 illustrate schematically the successive steps of operation of a butt-joining device according to the first embodiment of the invention.

FIGS. 2 and 3 illustrate a butt-joining device 6 according to a first embodiment of the invention. This butt-joining device 6 comprises:
  a heat-welding and cutting workstation 7, capable of heat-welding by ultrasound and of cutting two thicknesses of product 2 in a heat-welding and cutting zone,
  a laminating workstation 8 with means 9 for laminating by ultrasound the heat-welding and cutting zone, between which said product 2 (not shown) is intended to be moved in a strip or web of material in a movement illustrated by the arrow 10.

More precisely, the heat-welding and cutting workstation 7 comprises means 7a for heat-welding-cutting with sonotrode 7b with a sharpened face 7c. The heat-welding and cutting workstation 7 also comprises a heat-welding and cutting counterpart 11 extending in a fourth direction of extension IV-IV and with a substantially flat work face 11a.

The laminating workstation 8 comprises a laminating counterpart 12 extending in a third direction of extension III-III and with a substantially flat work face 12a. The laminating means 9 comprise a sonotrode 13 with a substantially flat face 15. More precisely, the substantially flat face 15 is usually an adjusted face with slight convexity as it is more particularly shown in FIG. 3.

The workstations 7 and 8 are oriented respectively in directions A-A and B-B of which the spacing d determines the distance separating the heat-welding and cutting workstation 7 and the laminating workstation 8.

The butt-joining device 6 according to the invention comprises means 16 for adjusting the relative position of the laminating means 9 and of the heat-welding and cutting zone to be laminated, such that, after heat-welding and cutting and after movement of the heat-welding and cutting zone to the laminating workstation 8 in the movement illustrated by the arrow 10, the heat-welding and cutting zone to be laminated is placed in correspondence with the laminating means 9.

In the first embodiment of the invention, it is shown more particularly in FIG. 3 that the adjustment means 16 comprise means for moving the laminating workstation 8 making it possible to move the laminating workstation 8 toward and away from the heat-welding and cutting workstation 7. The adjustment means 16 also comprise locking means suitable for fastening the laminating workstation 8 at different distances d from the heat-welding and cutting workstation 7.

In practice, the laminating workstation 8 is supported by a support 17 designed to be secured to two positioning end-pieces 18a and 18b by means of screws (not shown) engaged in oblong fastening holes 19a to 19d. The oblong fastening holes 19a to 19d make it possible to move the laminating workstation 8 toward and away from the heat-welding and cutting workstation 7 in order to vary the distance d separating them. The screws designed to be engaged in the oblong holes 19a to 19d make it possible to lock the workstations 7 and 8 at a determined distance d of separation.

In the case of FIG. 3, it can be seen that the heat-welding and cutting workstation 7 is also supported by a support 20 designed to be secured to positioning end-pieces 18a and 18b by means of screws (not shown) engaged in oblong fastening holes 21a to 21d. The heat-welding and cutting workstation 7 can thus be moved toward and away from the laminating workstation 8.

The adjustment means 16 make it possible to adjust the relative position of the heat-welding and cutting workstation 7 and the laminating workstation 8 such that, after movement of the product 2 (not shown) from the heat-welding and cutting workstation 7 to the laminating workstation 8, the heat-welding and cutting zone to be laminated is placed in exact correspondence with the laminating means 9.

Once the distance d is adjusted for a type of product, the adjustment can be retained while the machine 1 treats a product 2 of the same kind with substantially identical mechanical characteristics. It is therefore possible to automate the butt-joining operations by means of an advance of product 2 that is predetermined and reproducible between the heat-welding and cutting workstation 7 and the laminating workstation 8 for which the distance d of separation has been adjusted.

The use of the butt-joining device 6 of FIGS. 2 and 3 will now be explained with the aid of the schematic FIGS. 4 to 9 illustrating an operation for butt-joining the final end 20' of a product 2' originating from the unwinding of the unwinding reel 4 to the initial end 20" of a product 2" originating from the unwinding of the unwinding reel 3 in order to form a single, continuous product 2.

The device 6 comprises retention means 22 (not shown in FIGS. 2 and 3) for retaining the product 2 upstream of the heat-welding and cutting workstation 7, which means are capable of immobilizing an upstream section 2a of the product 2 extending from the retention means 22 to the heat-welding and cutting workstation 7. To do this, it can be seen in FIGS. 4 and 5 that the retention means 22 for retaining the product 2 upstream of the heat-welding and cutting workstation 7 comprise:
  a third deflection bar 23 for deflecting product 2,
  pinching means 24 that can be moved selectively between a retention position (FIG. 5) in which the pinching means 24 press on the third deflection bar 23 for deflecting product 2 by means of the product 2, and a released position (FIG. 4) in which the pinching means 24 are separated from the third deflection bar 23.

Prior to the butt-joining operations, the machine 1 is stopped so that the product 2' no longer moves in the movement illustrated by the arrow 25. The operator then takes hold of the end 20' of the product 2' to tension the product 2' between the subsequent workstation (not shown) and a tensioning bar 26. To do this, the tensioning bar 26 is furnished with means for coupling the end 20' with the aid of spikes or any other appropriate means. A rotation of the tensioning bar 26 according to the movement illustrated by the arrow 27 makes it possible to tension the product 2'.

The operator then puts the product 2" in place, bringing its end 20" onto a tensioning bar 28.

Figure 5:
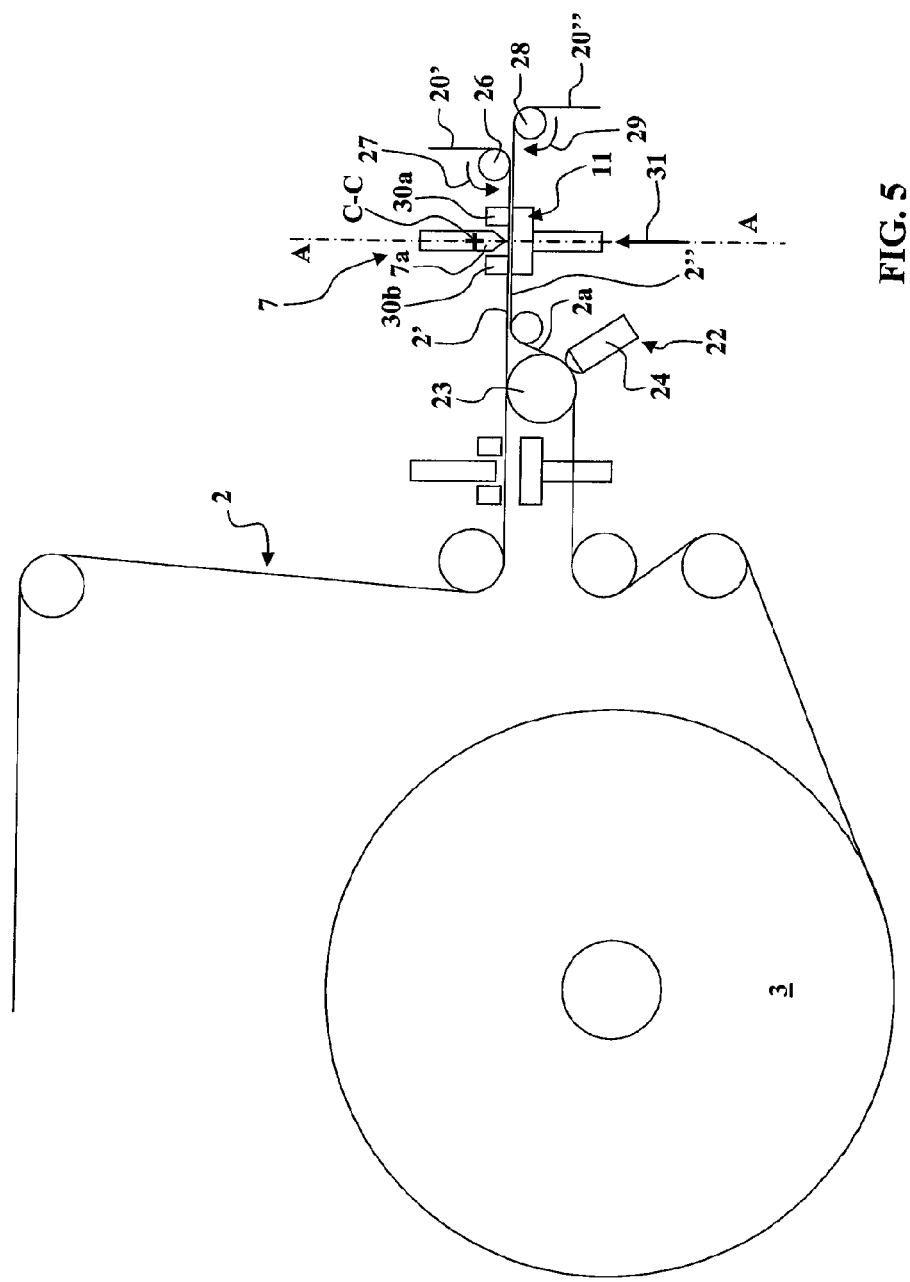

In order to prevent any movement of the unwinding reel 3 during the tensioning of the product 2' with the tensioning bar 28, the pinching means 24 are moved into retention position (FIG. 5). The tensioning bar 28 is then turned in the movement illustrated by the arrow 29: the upstream section 2a of product 2 extending from the retention means 22 to the heat-welding and cutting workstation 7 is thus tensioned and immobilized.

FIG. 5 shows that the heat-welding and cutting counterpart 11 is then moved toward pressing means 30a and 30b in a translation movement illustrated by the arrow 31. The pressing means 30a and 30b then press against the heat-welding and cutting counterpart 11 by means of two thicknesses of product 2, namely the products 2' and 2".

The heat-welding-cutting means 7a are then moved in the transverse direction CC across the width of the product 2 in order to carry out simultaneously the heat-welding and cutting operations.

Figure 6:
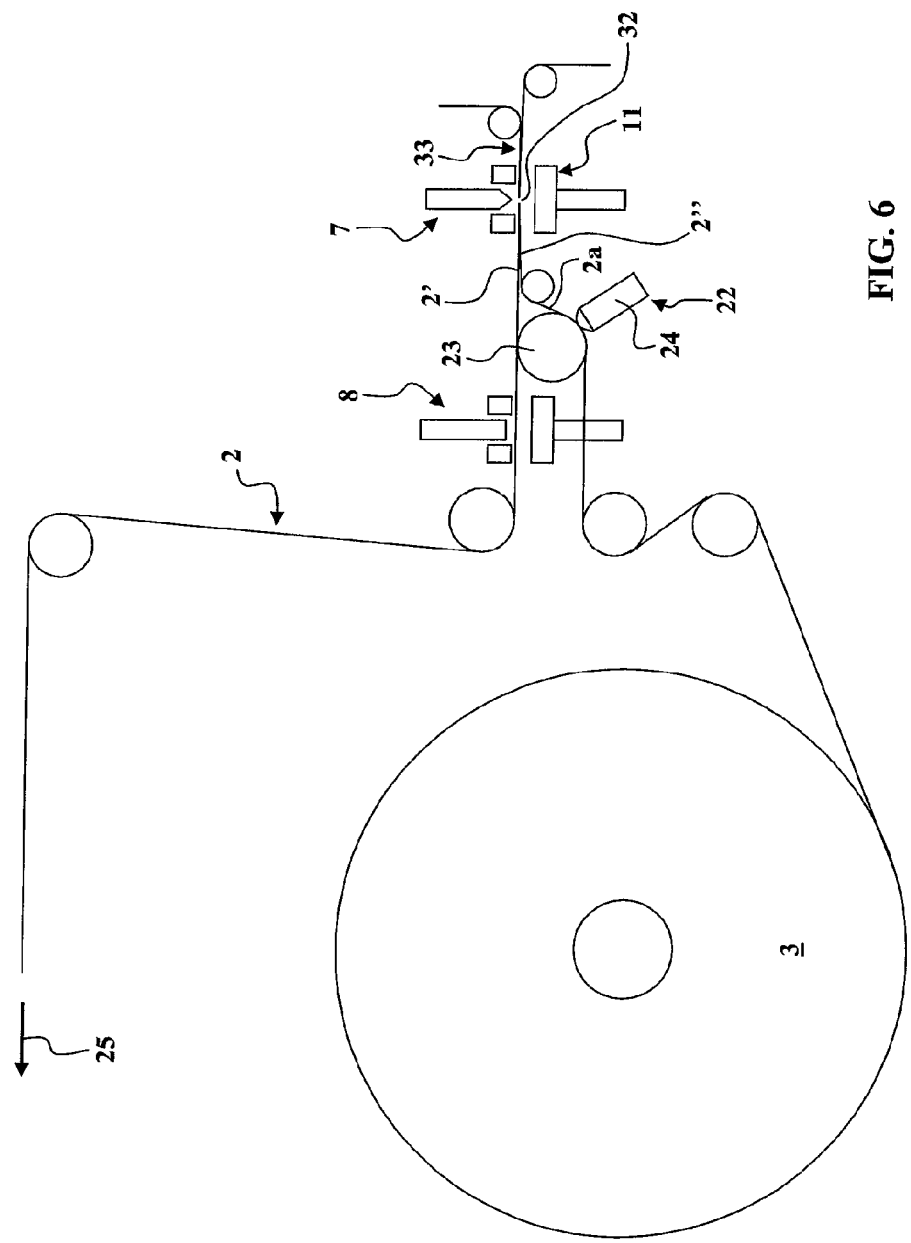

At the end of movement of the heat-welding-cutting means 7a, the heat-welding and cutting counterpart 11 is moved away from the pressing means 30a and 30b and reveals the configuration illustrated in FIG. 6.

In this configuration, the products 2' and 2" are joined in a heat-welding and cutting zone 32.

The parts of products 2' and 2" situated on the other side of the heat-welding and cutting zone 32 are a waste product 33 which is cleared away.

The product 2' is then advanced by pulling in a translation movement illustrated by the arrow 25, while the product 2" is retained by the retention means 22.

The result of this is that the heat-welding and cutting zone 32 moves from the heat-welding and cutting workstation 7 toward the laminating workstation 8. Because of the movement, the heat-welding and cutting zone 32 is slightly deformed by a partial flattening and thus forms a kind of crease 32a of which the strength by heat-welding is fragile and precarious. The heat-welding and cutting zone 32 must then be laminated to delete the crease 32a in order to obtain a heat-welding and cutting zone 32 that is substantially flat, even and of greater strength.

Figure 7:
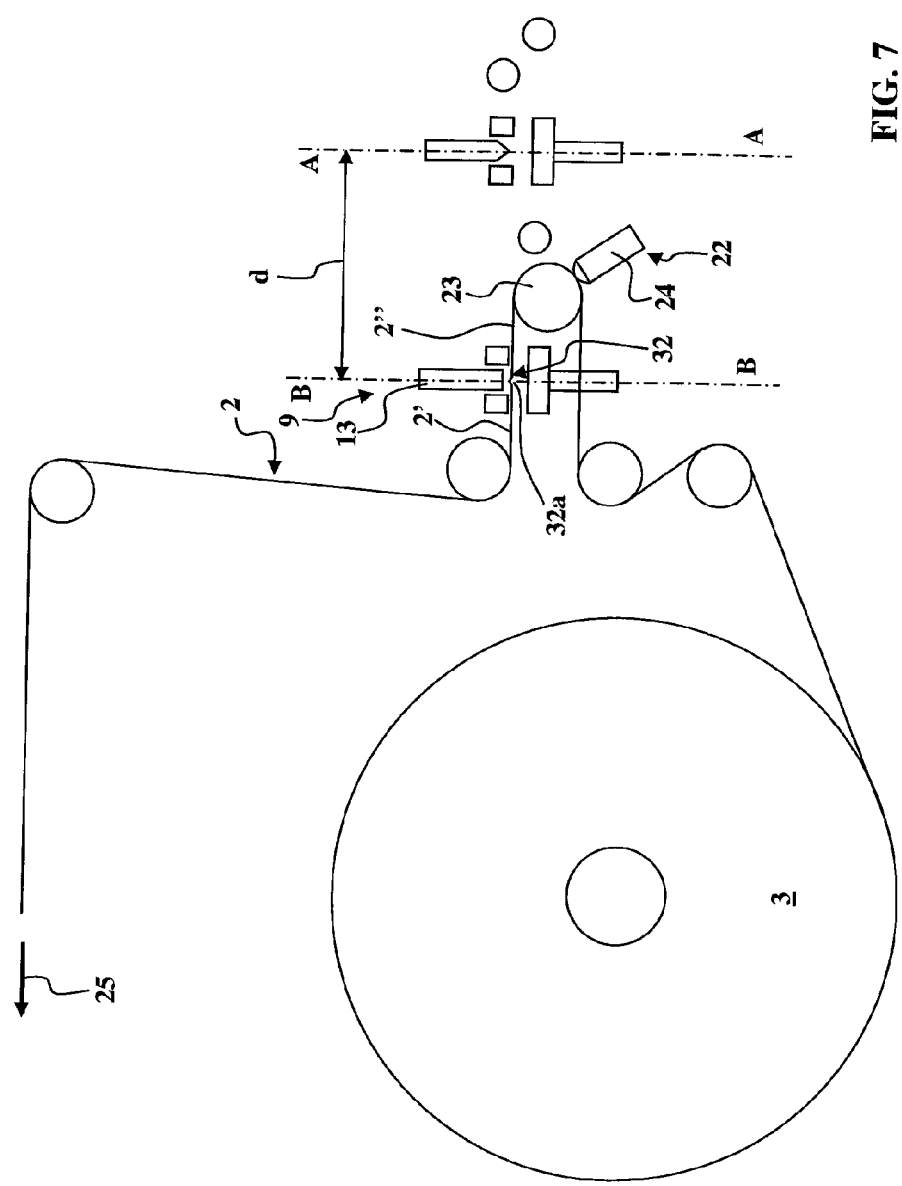
Figure 8:
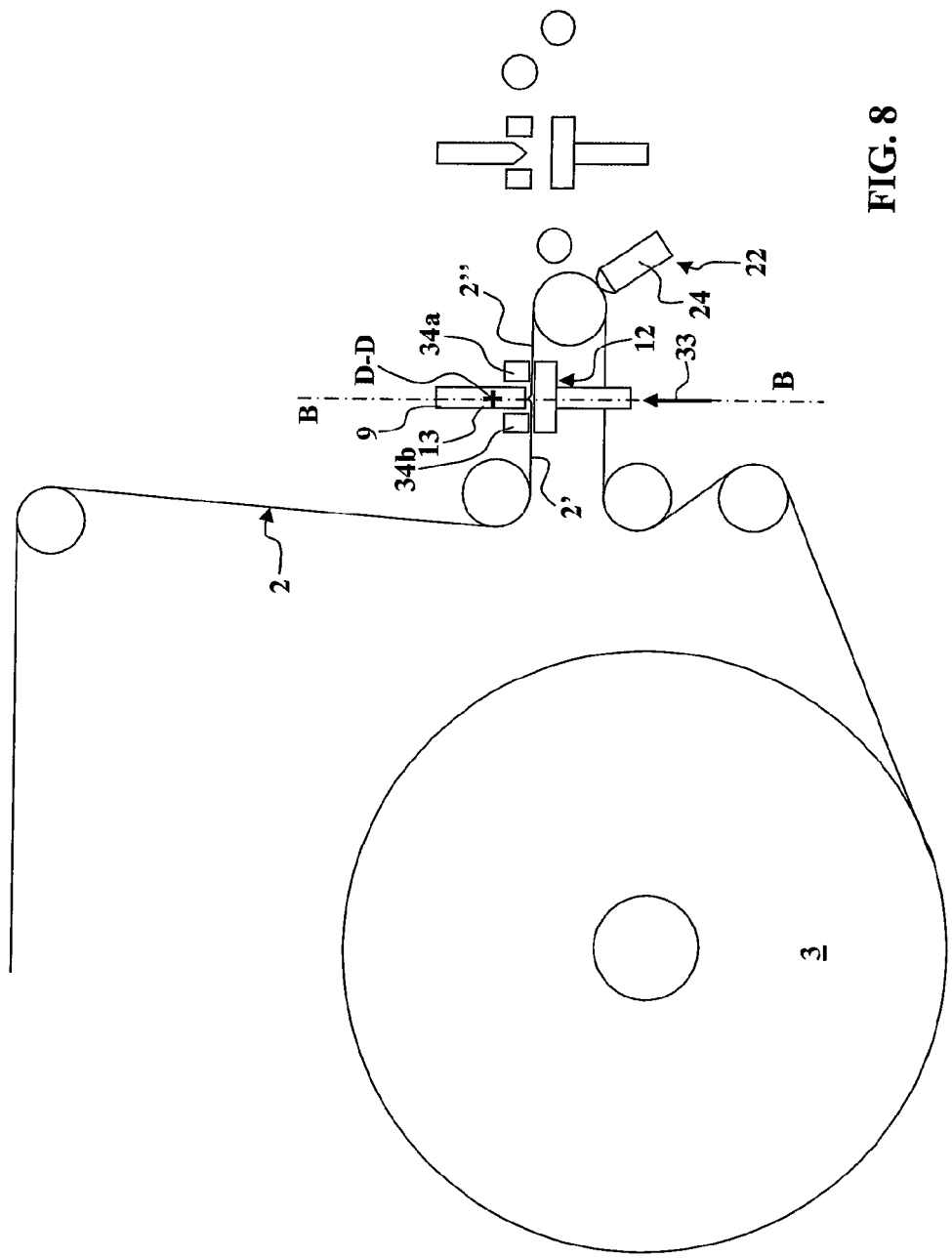
Figure 9:
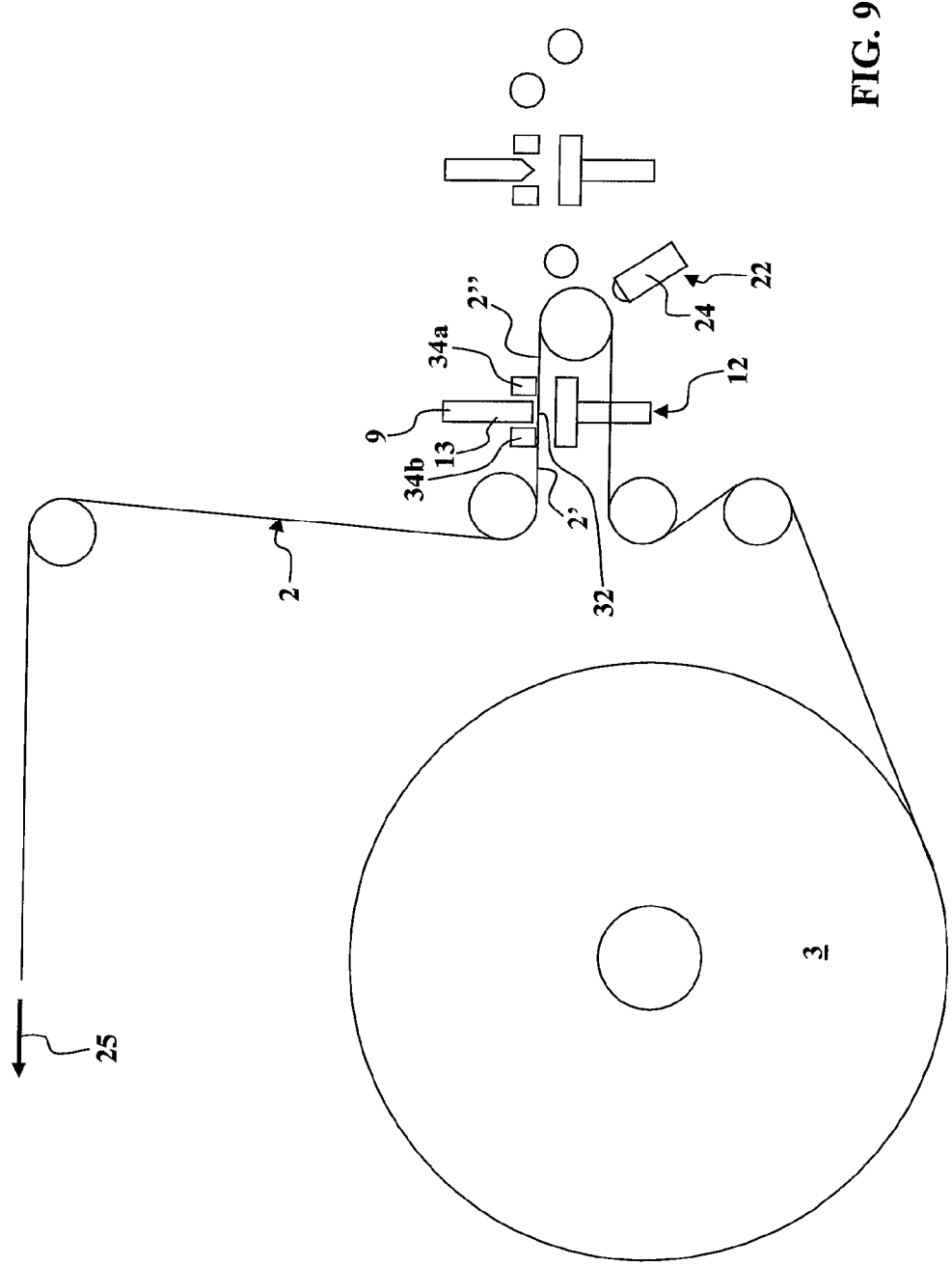

In FIG. 7, it can be seen that the heat-welding and cutting zone 32 is placed in correspondence with the laminating means 9. This relative position of the laminating means 9 and of the heat-welding and cutting zone 32 to be laminated is made reliable with the aid of the adjustment means 16 (not visible in FIG. 7) which have been previously adjusted during tests such that, after heat-welding and cutting and after movement of the heat-welding and cutting zone 32 toward the laminating workstation 8, the heat-welding and cutting zone 32 to be laminated is placed in correspondence with the laminating means 9.

The laminating of the heat-welding and cutting zone is then carried out. To do this, the laminating counterpart 12 is moved in a translation movement illustrated by the arrow 33 (FIG. 8) until it comes to rest against pressing means 34a and 34b of the laminating workstation 8. The laminating means 9 with sonotrode 13 are then moved in a transverse direction DD across the width of the product 2' over the whole length of the heat-welding and cutting zone 32.

At the end of the movement of the laminating means 9, the laminating counterpart 12 is moved away from the pressing means 34a and 34b and the pinching means 24 are moved into the released position. This then reveals the configuration illustrated in FIG. 9, in which the product 2' is connected to the product 2" by a heat-welding and cutting zone 32 that has been laminated. The product 2' can then be drawn in the movement illustrated by the arrow 25 toward the subsequent workstation (not shown), which will then also draw the product 2" toward the subsequent workstation while unrolling the unwinding reel 3.

Figure 10:
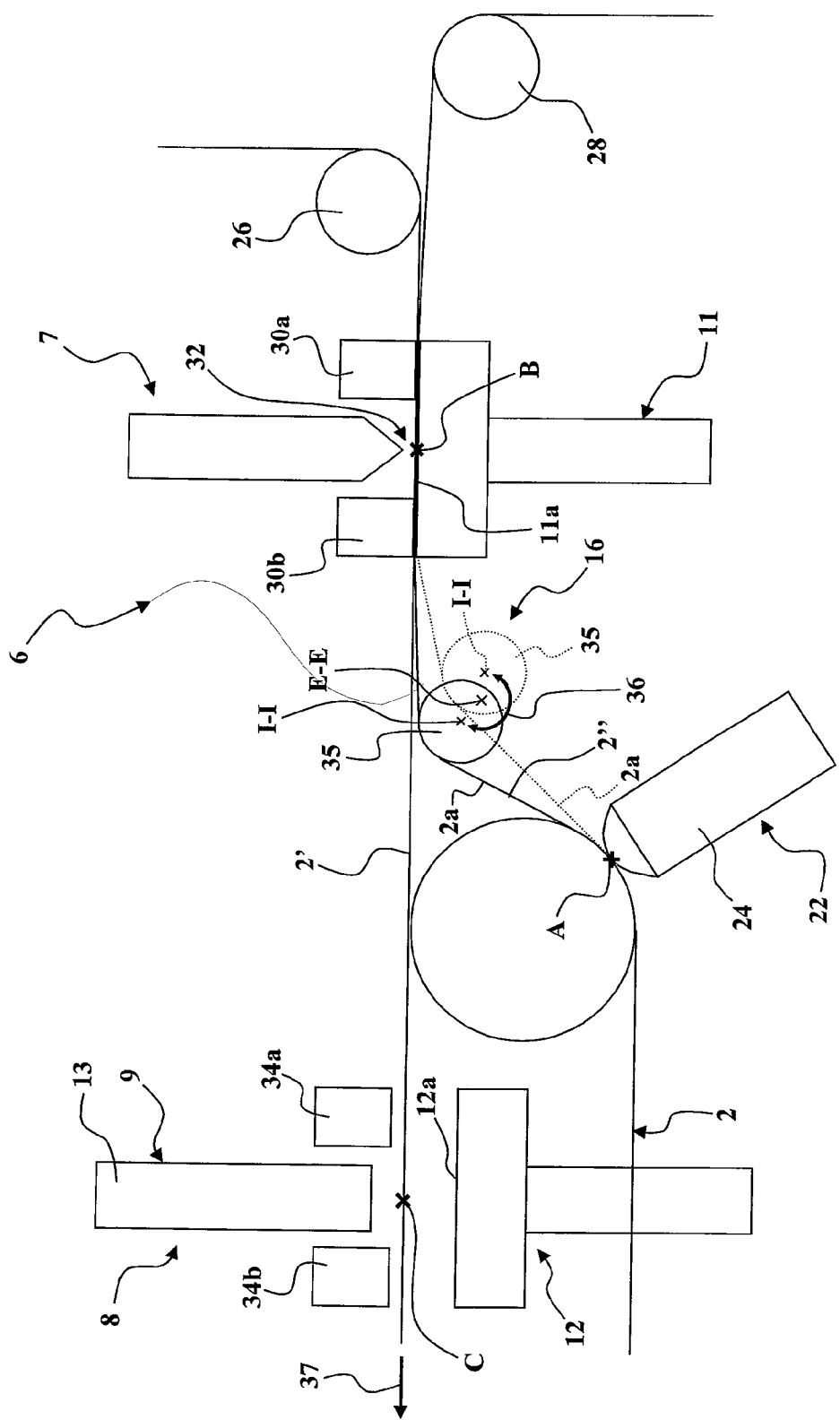
FIG. 10 is a schematic view illustrating the operation of a butt-joining device according to a second embodiment of the invention.

FIG. 10 illustrates a second embodiment of adjustment means 16 which may be an alternative or may complement the first embodiment described with the aid of FIGS. 2 and 3.

In FIG. 10, the butt-joining device 6 also comprises means 22 for retaining the product 2 upstream of the heat-welding and cutting workstation 7, which means are suitable for immobilizing an upstream section 2a of product 2 extending from the retention means 22 to the heat-welding and cutting workstation 7.

The adjustment means 16 comprise a first deflection bar 35 for deflecting product, situated between the retention means 22 and the heat-welding and cutting workstation 7 and extending in a first direction of extension I-I perpendicular to the direction of travel of the product 2 (that is to say across the width of the product 2).

The adjustment means 16 also comprise first transverse movement means of the first deflection bar 35, which means are capable of moving the first deflection bar 35 so as to adjust the length of the upstream section 2a of product 2 extending from the retention means 22 to the heat-welding and cutting workstation 7.

In the case of FIG. 10, the first transverse movement means are suitable for moving the first deflection bar 35 in a rotary movement illustrated by the double arrow 36 about an axis E-E offset from and parallel to the direction of extension I-I of said first deflection bar 35.

The adjustment of the adjustment means 16 that has to be carried out in advance consists in positioning, by rotation, the first deflection bar 35 in a position such that the length of the path followed by the upstream section 2a of product 2 extending between the retention means 22 (point A) and the heat-welding and cutting workstation 7 and more particularly to the heat-welding and cutting zone 32 that will be created (point B), is equal to the length of the path followed by the product between the retention means 22 (point A) and the laminating workstation 8 (point C) after advance of the product 2 in the movement illustrated by the arrow 37. In other words, the position of the first deflection bar 35 is adjusted such that the length of product between the points A and B before advance of the product is equal to the length of product extending between the points A and C after advance of the product 2.

As an alternative to a rotary movement of the first deflection bar 35, it is possible to arrange a movement via a translation movement.

In FIGS. 4 to 10, the heat-welding and cutting zone 32 of the product 2 is moved from the heat-welding and cutting workstation 7 toward the laminating workstation 8 by means for advancing the product 2 of a subsequent workstation (not shown) situated downstream of the laminating workstation 8.

If the means for advancing the product 2 of the subsequent workstation are unsuitable for ensuring a determined, reliable and reproducible movement of the product 2 (for example due to great inertia), it is preferable to incorporate means for advancing the product 2 that are specific to the butt-joining device 6. This also prevents having the subsequent workstation work at too low a speed during the movement of the heat-welding and cutting zone 32 toward the laminating workstation 8.

Figure 11:
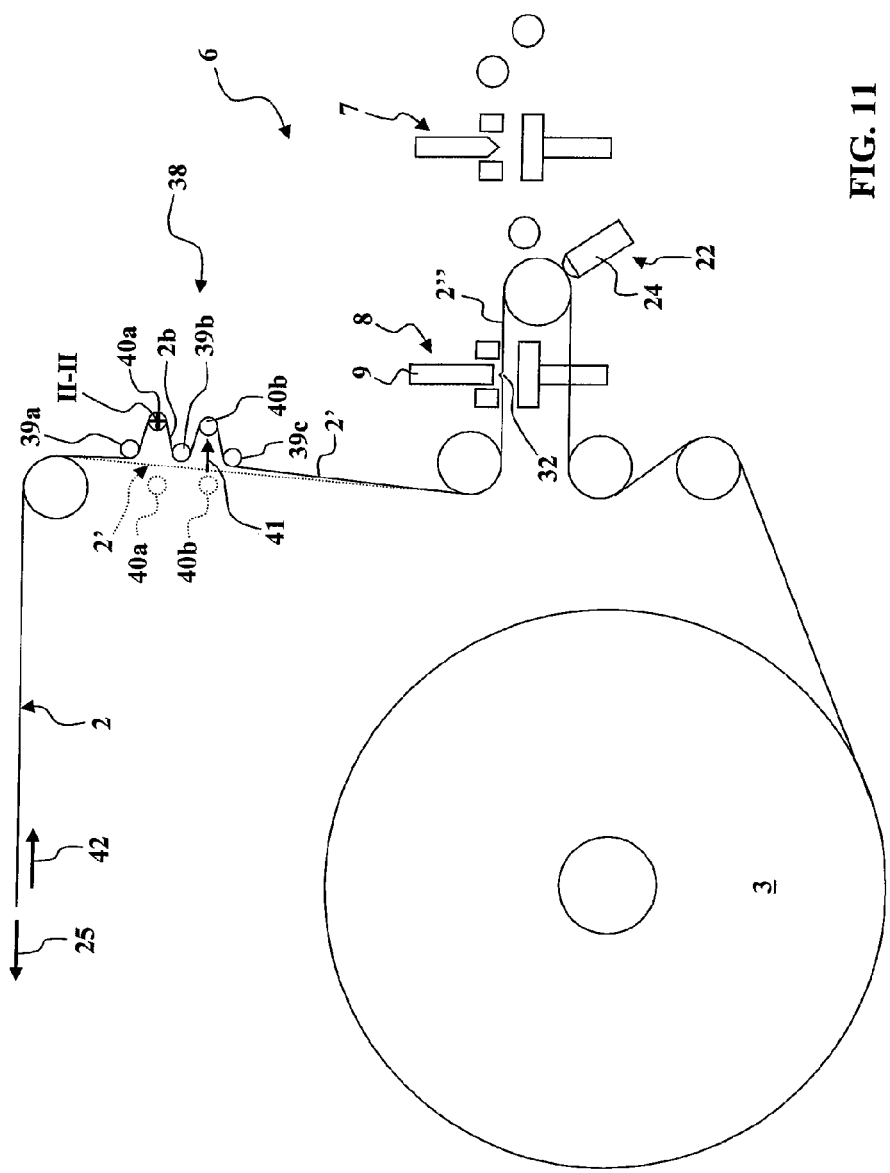
FIG. 11 is a schematic view of a variant butt-joining device according to the invention comprising a first type of accumulation means.

In a first variant, illustrated in FIG. 11, the butt-joining device 6 comprises accumulation means 38 that the product 2 traverses downstream of the laminating workstation 8. The accumulation means 38 are suitable for moving by pulling the heat-welding and cutting zone 32 from the heat-welding and cutting workstation 7 toward the laminating workstation 8.

In FIG. 11, the product 2 traverses the accumulation means 38 in a zigzag path of which the length is adjustable.

In the case of FIG. 11, the accumulation means 38 comprise three fixed bars 39a to 39c for deflecting product 2 and also comprise two bars 40a and 40b for deflecting product 2, which bars are situated downstream of the laminating workstation 8 and extend in a second direction of extension II-II perpendicular to the direction of advance of the product 2. Second means for the transverse movement of the second deflection bars 40a and 40b make it possible to move the latter so as to adjust the length of the section 2b of product 2 situated downstream of the laminating workstation 8.

In practice, the second deflection bars 40a and 40b are movable, in a movement illustrated by the arrow 41, between a rest position (illustrated in dotted lines) in which they do not touch the product 2, and an accumulation position (illustrated in solid lines) in which the second deflection bars 40a and 40b bring the product 2 into contact with the fixed deflection bars 39a to 39c in order to accumulate the product 2 on a zigzag path between the fixed deflection bars 39a and 39c.

Preferably, in the rest position of the second deflection bars 40a and 40b, the product 2 touches neither the second deflection bars 40a and 40b nor the fixed deflection bars 39a to 39c so as not to induce additional resistance to the advancing of the product 2 in the movement illustrated by the arrow 25.

The accumulation of the product 2 on its zigzag path between the deflection bars 39a to 39c and 40a and 40b makes it possible to pull the heat-welding and cutting zone 32 to correspond exactly with the laminating means 9 without having to move the product 2 downstream in the movement illustrated by the arrow 25.

Figure 12:
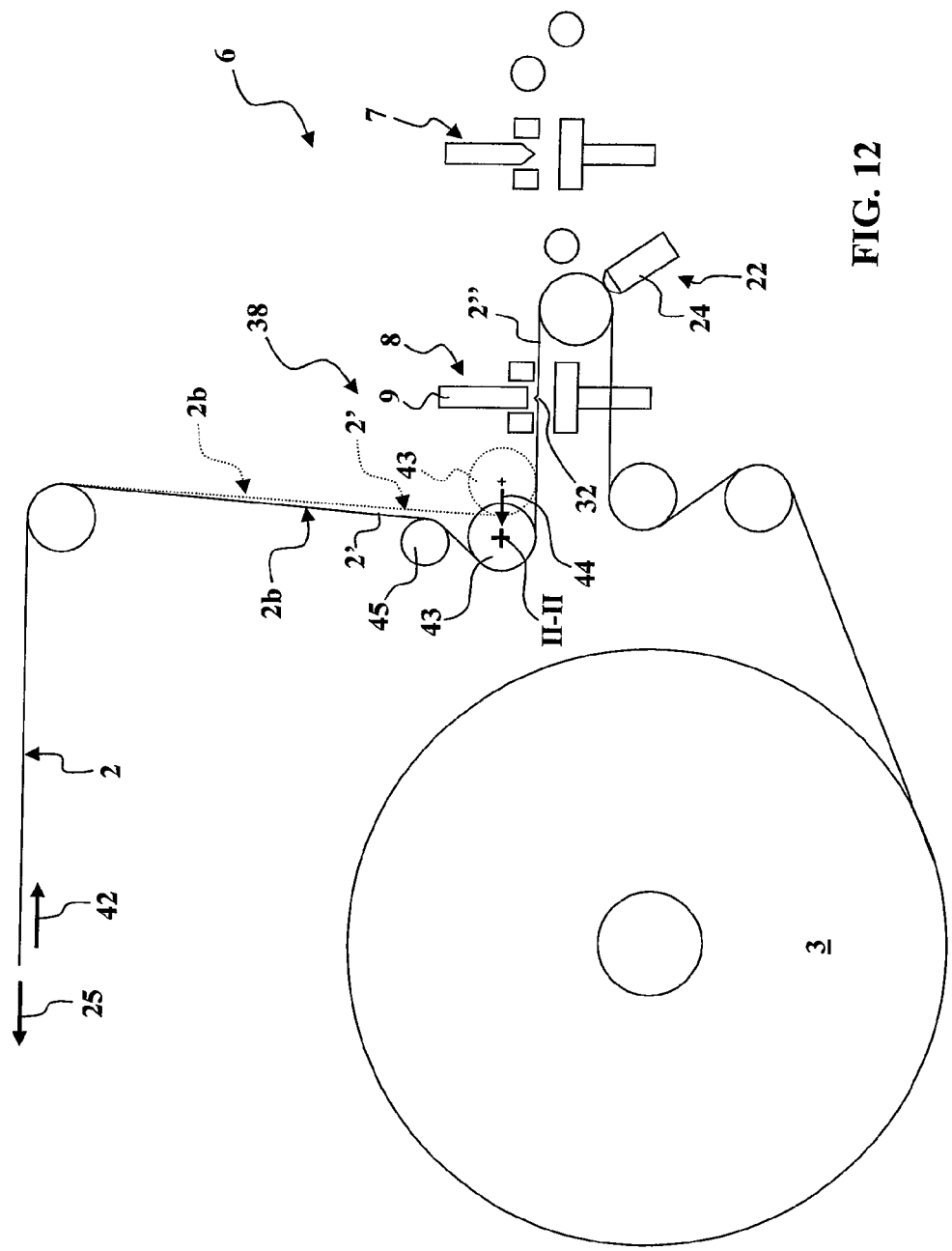
FIG. 12 is a schematic view of a variant butt-joining device according to the invention comprising a second type of accumulation means.

FIG. 12 illustrates a second variant of the accumulation means 38 in which the accumulation means comprise only one second deflection bar 43 situated downstream of the laminating workstation 8 and extending in the second direction of extension II-II. The second transverse movement means are suitable for moving the second deflection bar 43 in a translation movement illustrated by the arrow 44, which makes it possible to adjust the length of the section 2b of product 2 situated downstream of the laminating workstation 8 in order to pull the heat-welding and cutting zone 32 to be laminated to correspond exactly with the laminating means 9.

In FIG. 12, the section 2b of product 2 comes, after movement of the second deflection bar 43, into contact with a fixed deflection bar 45. This fixed deflection bar 45 is optional.

In the first and second variants illustrated in FIGS. 11 and 12, the second deflection bars 40a, 40b and 43 are moved in a translation movement. These second deflection bars 40a, 40b and 43 could however be moved in a rotary movement about an axis that is offset from and parallel to their direction of extension II-II. This rotary movement of a second deflection bar is the subject of the third variant illustrated in FIG. 13.

In this figure, the accumulation means 38 comprise two second deflection bars 46 and 47 situated downstream of the laminating workstation 8 and extending in a second direction of extension II-II perpendicular to the direction of advance of the product 2.

The second deflection bars 46 and 47 are connected to one another rigidly by a crossmember 48 mounted so as to pivot about an axis F-F parallel to the second direction of extension II-II. In order to adjust the length of the section 2b of product 2 situated downstream of the laminating workstation 8, the second deflection bars 46 and 47 are rotated about the axis F-F in a movement illustrated by the arrow 49. The second deflection bars 46 and 47 are thus moved from a rest position (in dotted lines) to an accumulation position (illustrated in solid lines).

Adjusting the length of the section 2b of product 2 situated downstream of the laminating workstation 8 makes it possible to pull the heat-welding and cutting zone 32 to be laminated to correspond exactly with the laminating means 9.

Figure 13:
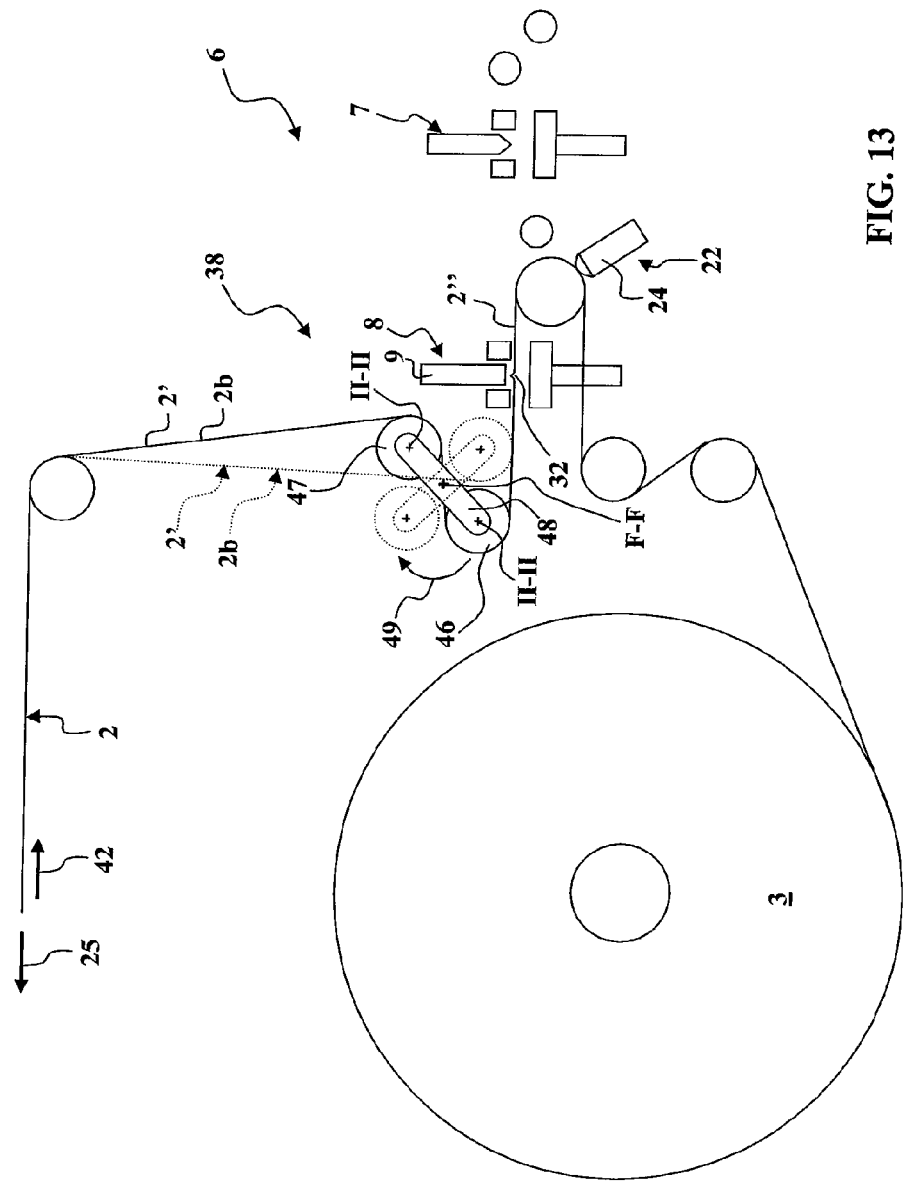
FIG. 13 is a schematic view of a variant butt-joining device according to the invention comprising a third type of accumulation means.

In the first, second and third variants of FIGS. 11 to 13, it may be necessary to provide means (not shown) for retaining the product 2 downstream of the accumulation means 38, or means for irreversibly advancing the product 2 from the subsequent workstation so that the product 2 cannot be moved in a movement illustrated by the arrow 42 during the operation of the accumulation means 38. This makes it possible to avoid inducing inaccuracy in the advancement of the product 2 caused by the accumulation means 38.

During the lamination operation by the laminating means 9, it is important that the product 2 is held between the laminating counterpart 12 and the substantially flat face 15 of the sonotrode 13.

However, because of the usually great length of the laminating counterpart 12, the latter may have a curve and twisting deformations.

It is therefore necessary to ensure that the sonotrode 13 follows as closely as possible the work face 12a of the laminating counterpart 12, despite this possible curve and twist.

Figure 15:
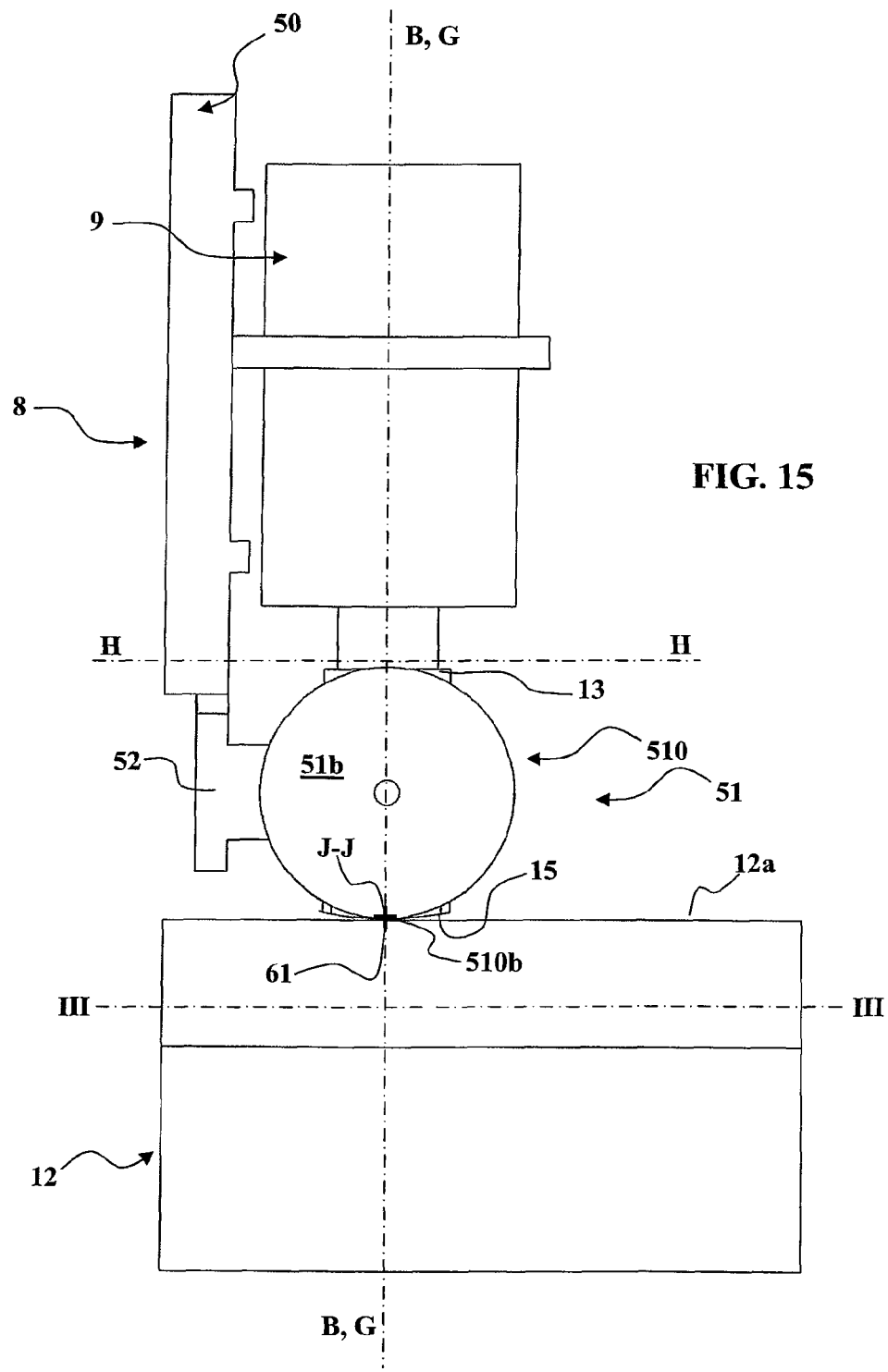
FIG. 15 is a side view of the laminating station of FIG. 14.
Figure 16:
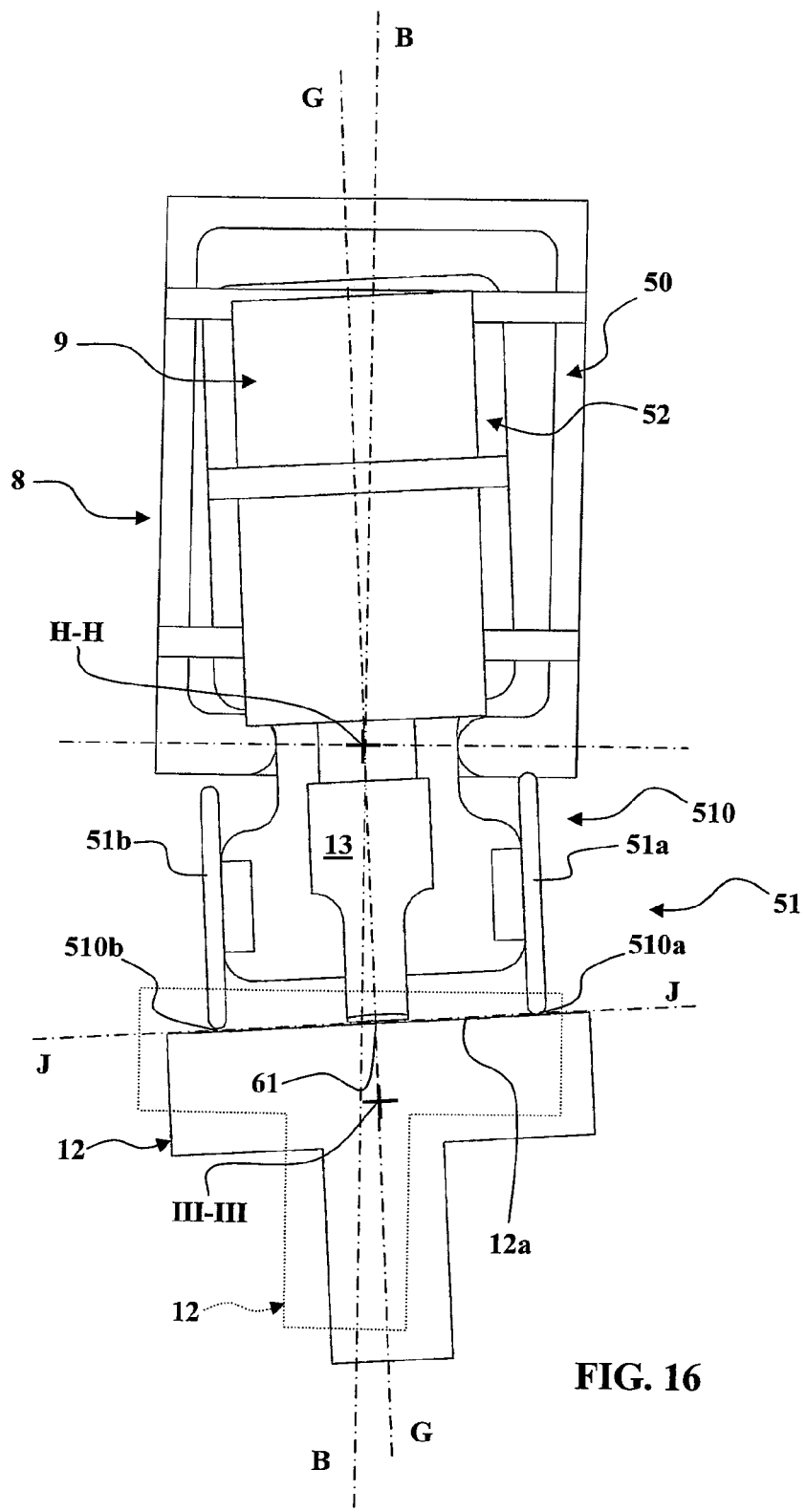
FIG. 16 is a front view of the laminating station of FIG. 14 during work.
Figure 17:
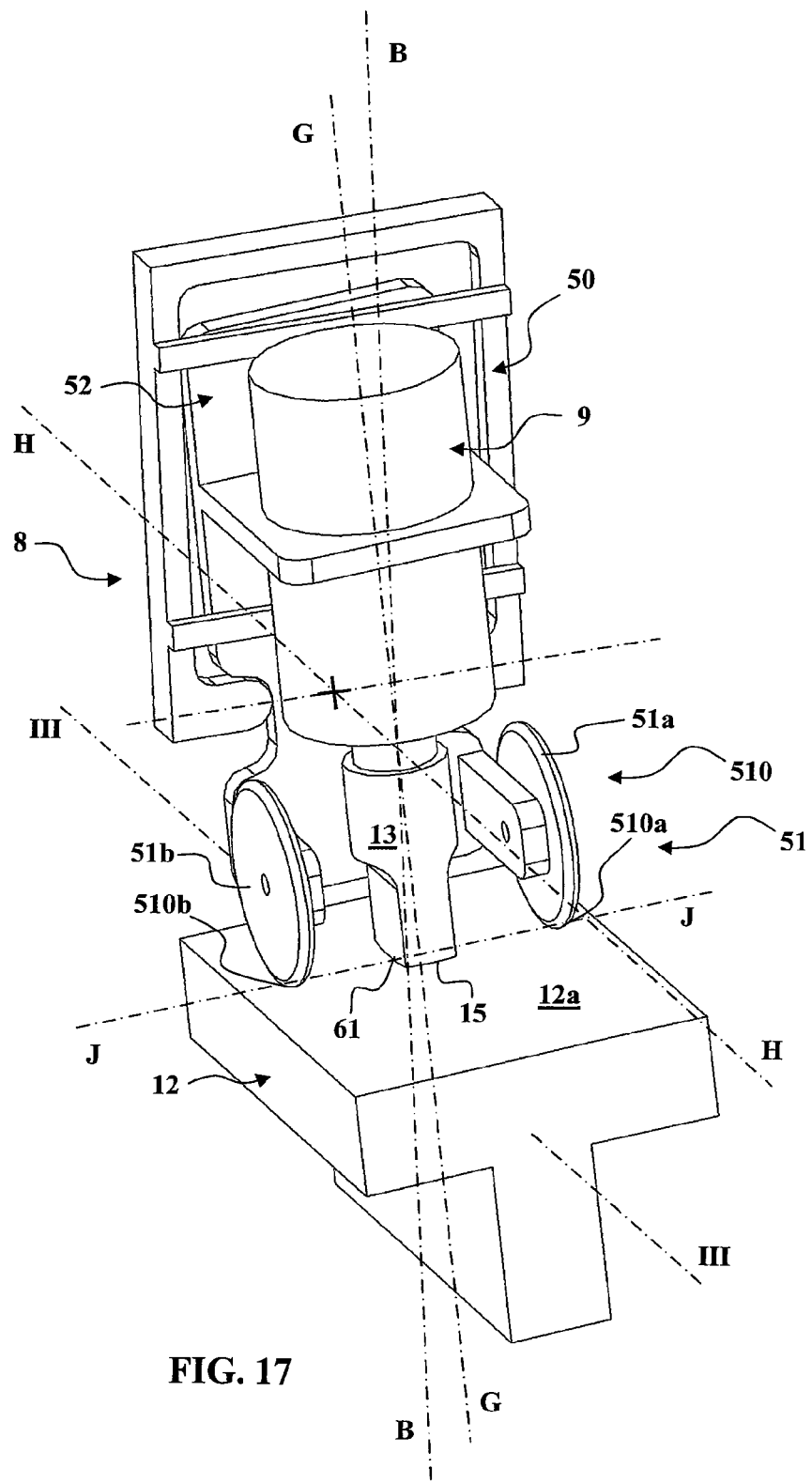
FIG. 17 is a view in perspective of the laminating station of FIG. 16.

To do this, as illustrated in FIGS. 15 to 17, it is provided that:

the laminating workstation 8 comprises a laminating counterpart 12 extending in a third direction of extension III-III with a substantially flat work face 12a, the laminating means 9 are secured to a support 50 that can be moved in the third direction of extension III-III facing the laminating counterpart 12, the laminating means 9 are secured to bearing means 51 (in this instance rolling means 510) formed to press against the work face 12a of the laminating counterpart 12, the laminating means 9 are secured to the support 50 by means of connecting means 52 formed to allow:

a translation movement in a direction G-G substantially perpendicular to the plane of the work face 12a, a rotary movement about a direction H-H substantially parallel to the third direction of extension III-III.

The sonotrode 13 of the laminating workstation 8 is thus capable of following the possible deformations of the work face 12a of the laminating counterpart 12 right along the laminating counterpart 12 as illustrated in FIG. 16 in which the laminating counterpart 12, having to occupy a theoretical position illustrated in dotted lines, in reality occupies the position illustrated in solid lines because of the deformations by bending and twisting. The support 50 remains oriented in the direction B-B.

Figure 14:
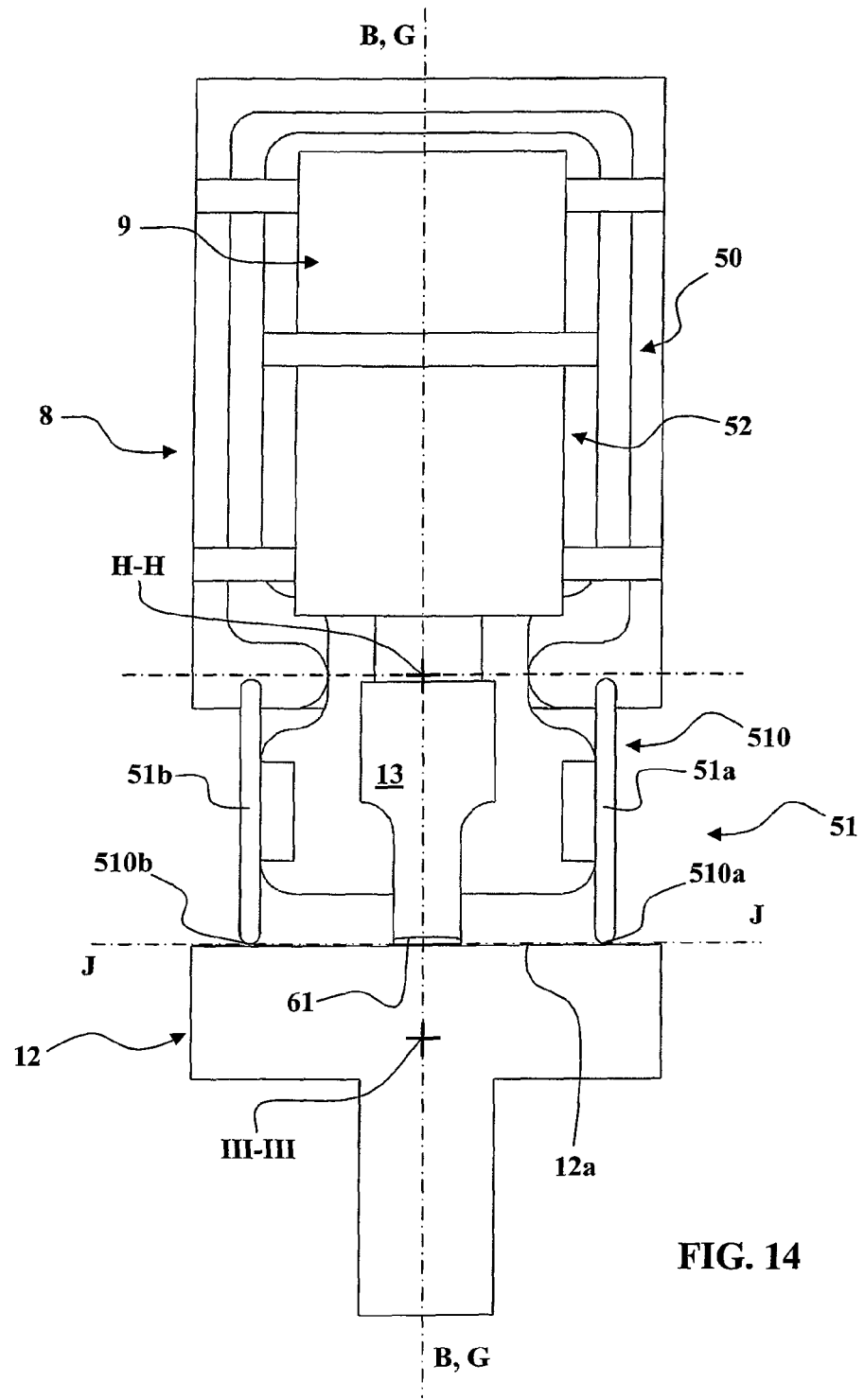
FIG. 14 is a front view of a laminating station.

In FIGS. 14 and 17, the rolling means 510 comprise two wheels 51a, 51b situated on either side of the laminating means 9 so as to come, by means of the product (not shown), to rest against the work face 12a of the laminating counterpart 12 on either side of the heat-welding and cutting zone 32 (not shown) to be laminated.

As is more particularly visible in FIGS. 15 and 17, the wheels 51a and 51b come respectively into contact with the laminating counterpart 12 by means of the product 2 (not shown) at two points 510a and 510b which define a direction of contact J-J defining a plane with the direction G-G of orientation of the sonotrode 13. Preferably, the bottom edge 61 of the substantially flat face 15 of the sonotrode 13 is included in the plane defined by the directions J-J and G-G. In FIG. 17, the bottom edge 61 substantially coincides with the direction of contact J-J.

It should be noted that a support and connecting means similar to the support 50 and to the connecting means 52 may also be used for the heat-welding and cutting workstation 7 of which the heat-welding and cutting counterpart 11 may also have deformations.

Figure 18:
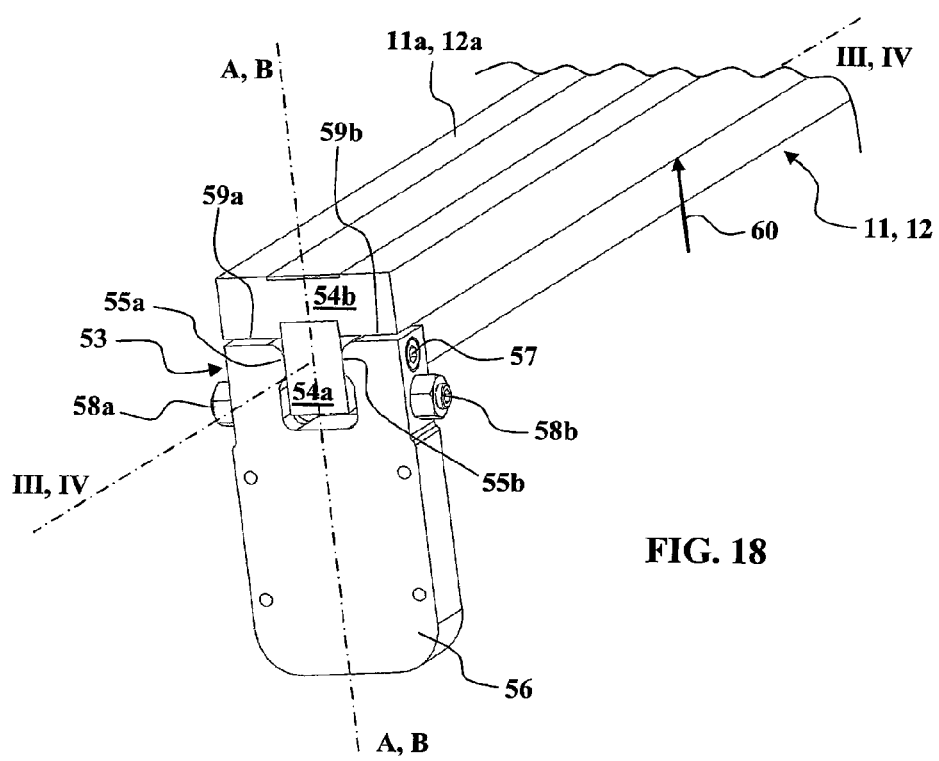
FIG. 18 is a partial view in perspective of a heat-welding and cutting counterpart and/or a laminating counterpart.

As an alternative or to complement the particular connecting means 52 used for the laminating workstation 8 in FIGS. 14 to 17, it is possible to provide deformation means 53 of the work face 11a, 12a of the heat-welding and cutting counterpart 11 and/or of the laminating counterpart 12, as shown in FIG. 18.

In this FIG. 18, the heat-welding and cutting counterpart 11 and/or the laminating counterpart 12 comprises a T-shaped cross section. In this instance, this T-shaped cross section is obtained by the connection of two section pieces 54a and 54b. As an alternative, the T-shaped cross section may be obtained by a single solid section piece. The work face 11a or 12a is supported by the outer face of the upper bar of the T formed by the section piece 54b.

The vertical bar of the T, formed by the section piece 54a, is kept clamped between two jaws 55a and 55b of a fixed retaining end-piece 56. The clamping of the section piece 54a in the jaws 55a and 55b is provided by means of at least one clamping screw 57.

The deformation means 53 comprise two screws 58a and 58b designed to press against the vertical bar of the T formed by the section piece 54a.

The greater or lesser clamping of the screws 58a and 58b makes it possible to subject the heat-welding and cutting counterpart 11 and the laminating counterpart 12 to a torsional moment about the direction III-III III-III or IV-IV in order to straighten the work face 11a or 12a deformed by a preexisting deforming twist.

It should be noted that the deformation means 53 may preferably comprise a retaining end-piece 56 identical to that of FIG. 18 at each of the ends of the heat-welding and cutting counterpart 11 or of the laminating counterpart 12.

As an alternative or as a complement, the deformation means 53 may comprise adjusting screws designed to press against the undersides 59a and 59b of the heat-welding and cutting counterpart 11 or of the laminating counterpart 12 in order to generate a pressure in the sense and direction defined by the arrow 60. Such deformation means 53 make it possible to induce on the heat-welding and cutting counterpart 11 or on the laminating counterpart 12 a deformation that compensates for a preexisting curve. It should be noted that the pressure illustrated by the arrow 60 is necessarily at a distance from the third or fourth directions of extension III-III and IV-IV and may therefore also induce on the heat-welding and cutting counterpart 11 or on the laminating counterpart 12 a twist which compensates for a preexisting inverse twist.

It is explicitly specified that the support 50 and the particular connecting means 52 illustrated in FIGS. 14 to 17 constitute an invention independent of the adjustment means 16. This support 50 and these connecting means 52 may be used in a laminating workstation 8 or in a heat-welding and cutting workstation 7.

Similarly, the deformation means 53 illustrated in FIG. 18 constitute an invention independent of the adjustment means 16.

The expression "deflection bar" means any longitudinal body of any section against which the product can press, and may notably comprise a roller capable of rotating about its direction of extension.

The present invention is not limited to the embodiments that have been explicitly described, but it includes the various variants and generalized applications contained in the field of the following claims.

The invention claimed is:

1. A device (6) for butt-joining a product (2, 2', 2") in a strip or in a web of material, comprising:
   a heat-welding and cutting workstation (7) capable of heat-welding and cutting two thicknesses of product (2, 2', 2") along a heat-welding and cutting zone (32),
   a laminating workstation (8) with means (9) for laminating by heating the heat-welding and cutting zone (32),
   between which said product (2, 2', 2") in a strip or in a web of material is designed to be moved according to a movement defined by means (22) for retaining the product (2, 2") upstream of the laminating workstation (8) and by a means for pulling the product (2, 2', 2") downstream of the laminating workstation (8),
   wherein, in the heat-welding and cutting workstation and in the laminating workstation, the heating is carried out by ultrasound, and in that the device comprises means (16) for adjusting the relative position of the laminating means (9) and of the heat-welding and cutting zone (32) to be laminated, so that, after heat-welding and cutting and after movement of the heat-welding and cutting zone (32) to the laminating workstation (8), the heat-welding and cutting zone (32) to be laminated is placed in correspondence with the laminating means (9).

2. The device (6) as claimed in claim 1, wherein:
   the adjustment means (16) comprise means for the relative movement of the laminating workstation (8) and heat-welding and cutting workstation (7),
   the adjustment means (16) comprise locking means suitable for fixing the laminating workstation (8) and the heat-welding and cutting workstation (7) at different distances (d) of relative separation.

3. The device (6) as claimed in claim 1 wherein:
   the adjustment means (16) comprise a first product (2, 2") deflection bar (35), situated between the retention means (22) and the heat-welding and cutting workstation (7) and extending in a first direction of extension (I-I) perpendicular to the direction of travel of the product (2, 2"),
   the adjustment means (16) comprise first means for transverse movement of the first deflection bar (35), capable of moving the first deflection bar (35) so as to adjust the length of the upstream section (2a) of product (2, 2") extending from the retention means (22) to the heat-welding and cutting workstation (7).

4. The device (6) as claimed in claim 1, comprising means (22) for retaining the product (2, 2") upstream of the heat-welding and cutting workstation (7), which means are capable of immobilizing an upstream section (2a) of product (2, 2") extending from the retention means (22) to the heat-welding and cutting workstation (7) and preferably comprising:
   a third product (2, 2") deflection bar (23),
   pinching means (24) that can be moved selectively between a retention position in which the pinching means (24) press on the third product (2, 2") deflection bar (23) by means of the product (2, 2"), and a position of release in which the pinching means (24) are separated from the third deflection bar (23).

5. The device (6) as claimed in claim 1, wherein:
the laminating workstation (8) comprises a laminating counterpart (12) extending in a third direction of extension (III-III), with a work face (12a) that is substantially flat,
the laminating means (9) are secured to a support (50) that can be moved in the third direction of extension (III-III) opposite the laminating counterpart (12),
the laminating means (9) are secured to bearing means (51) formed to press against the work face (12a) of the laminating counterpart (12),
the laminating means (9) are secured to the support (50) by means of connecting means (52) formed to allow:
a movement of translation in a direction (G-G) substantially perpendicular to the plane of the work face (12a),
a rotary movement about a direction (H-H) substantially parallel to the third direction of extension (III-III).

6. The device (6) as claimed in claim 5, wherein the bearing means (51) are situated on either side of the laminating means (9) so as to press, by means of the product (2, 2', 2"), against the work face (12a) of the laminating counterpart (12) on either side of the heat-welding and cutting zone (32) to be laminated, and preferably comprise rolling means (510) with two wheels (51a, 51b).

7. The device (6) as claimed in claim 1, wherein the heat-welding and cutting zone (32) of the product (2) is moved by pulling from the heat-welding and cutting workstation (7) to the laminating workstation (8) by means for advancing the product (2, 2', 2") of a subsequent workstation situated downstream of the laminating workstation (8).

8. The device (6) as claimed in claim 1, wherein:
the device (6) comprises accumulation means (38) that the product (2, 2', 2") downstream of the laminating workstation (8) traverses,
the accumulation means (38) are suitable for moving by pulling the heat-welding and cutting zone (32) to be laminated of the product (2, 2', 2") from the heat-welding and cutting workstation (7) to the laminating workstation (8).

9. The device (6) as claimed in claim 8, wherein the product (2, 2', 2") traverses the accumulation means (38) on a zigzag path of which the length is adjustable.

10. The device (6) as claimed in claim 8, wherein the accumulation means (38) comprise:
at least one second product (2, 2', 2") deflection bar (40a, 40b, 43) situated downstream of the laminating workstation (8) and extending in a second direction of extension (II-II) perpendicular to the direction of travel of the product (2, 2', 2"),
second transverse movement means of the second deflection bar (40a, 40b, 43) so as to adjust the length of the product (2, 2', 2") section (2b) situated downstream of the laminating workstation (8).

11. The device (6) as claimed in claim 3, wherein the movement means move the first deflection bar (35) or the second deflection bar (40a, 40b, 43) in a movement of translation.

12. The device (6) as claimed in claim 3, wherein the movement means move the first deflection bar (35) or the second deflection bar (40a, 40b, 43) in a rotary movement about an offset axis (E-E) parallel to the direction of extension (I-I, II-II) of said first deflection bar (35) or second deflection bar (40a, 40b, 43).

13. The device (6) as claimed in claim 1, wherein the heat-welding and cutting workstation (7) comprises heat-welding-cutting means (7a).

14. The device (6) as claimed in claim 13, wherein:
the heat-welding and cutting workstation (7) comprises a heat-welding and cutting counterpart (11) extending in a fourth direction of extension (IV-IV), with a substantially flat work face (11a),
the heat-welding-cutting means (7a) comprise a sonotrode (7b) with a sharpened face (7c).

15. The device (6) as claimed in claim 1, wherein:
the laminating workstation (8) comprises a laminating counterpart (12) extending in a third direction of extension (III-III), with a substantially flat work face (12a),
the laminating means (9) comprise a sonotrode (13) with a substantially flat face (15).

16. The device (6) as claimed in claim 14, comprising means (53) for deforming the work face (11a, 12a) of the heat-welding and cutting counterpart (11) and/or of the laminating counterpart (12).

17. The device (6) as claimed in claim 16, wherein:
the heat-welding and cutting counterpart (11) and/or the laminating counterpart (12) comprises a T-shaped cross section, the work face (11a, 12a) being supported by the external face of the upper bar of the T (54b),
the deformation means (53) comprise at least one screw (58a, 58b) designed to press against the vertical bar of the T (54a), preferably two screws (58a, 58b) each situated in the vicinity of one end of said counterpart (11a, 12a).

18. The device (6) as claimed in claim 14, wherein the heat-welding and cutting workstation (7) and/or the laminating workstation (8) comprise pressing means (30a, 30b, 34a, 34b) designed to press against the corresponding counterpart (11, 12) by means of the product (2, 2', 2").

19. The device (6) as claimed in claim 18, wherein the counterpart(s) (11, 12) can be moved toward the corresponding pressing means (30a, 30b, 34a, 34b) in order to cause said pressure.

20. A machine (1) for processing a product (2, 2', 2") in a strip or in a web of material, comprising a butt-joining device (6) as claimed in claim 1.

* * * * *